United States Patent
Masel et al.

(10) Patent No.: US 11,764,529 B2
(45) Date of Patent: Sep. 19, 2023

(54) ELONGATED BUSBAR BOARD

(71) Applicant: WÖHNER BESITZ GMBH, Rödental (DE)

(72) Inventors: Joram Masel, Küps (DE); Florian Höfner, Rödental (DE)

(73) Assignee: WÖHNER BESITZ GMBH, Rödental (DE)

( * ) Notice: Subject to any disclaimer, the term of this patent is extended or adjusted under 35 U.S.C. 154(b) by 77 days.

(21) Appl. No.: 17/343,956

(22) Filed: Jun. 10, 2021

(65) Prior Publication Data

US 2021/0399509 A1  Dec. 23, 2021

(30) Foreign Application Priority Data

Jun. 19, 2020  (EP) ..................................... 20181085

(51) Int. Cl.
    *H01R 25/16* (2006.01)
    *H01R 13/447* (2006.01)
    *H02G 5/04* (2006.01)
    *H02G 5/00* (2006.01)

(52) U.S. Cl.
    CPC ......... *H01R 25/162* (2013.01); *H01R 13/447* (2013.01); *H01R 25/165* (2013.01); *H02G 5/04* (2013.01); *H02G 5/005* (2013.01)

(58) Field of Classification Search
    CPC .. H01R 25/162; H01R 13/447; H01R 25/165; H01R 13/02; H01R 13/025; H02G 5/04; H02G 5/005; H02G 5/025; H02G 5/002; H02B 1/14; H02B 1/32; H02B 1/20; H01B 1/21; H01B 7/0009; H01B 7/02
    See application file for complete search history.

(56) References Cited

U.S. PATENT DOCUMENTS 9,917,432 B2      3/2018  Serrdynski et al.
2019/0393640 A1*  12/2019 Steinberger .............. H02B 1/14

FOREIGN PATENT DOCUMENTS

| EP | 3 503 311 A1 | 6/2019 |
| WO | 2017198484 A1 | 11/2017 |
| WO | 2019174886 A1 | 9/2019 |

OTHER PUBLICATIONS

European Search Report corresponding to European application No. EP20181085.0 dated Nov. 18, 2020, (7 pages).

* cited by examiner

*Primary Examiner* — Travis S Chambers
(74) *Attorney, Agent, or Firm* — Maginot, Moore & Beck LLP

(57) ABSTRACT

An elongated busbar board for connection of devices to a power busbar system comprises a front side touch protection cover plate consisting of touch protection cover plate segments made of an electrically insulating material and having feedthrough openings The touch protection cover plate is adapted to cover power busbars made of an electrically conductive material having contact openings lying directly beneath the feedthrough openings and comprises a touch protection base plate connected to the touch protection cover plate and consisting of touch protection base plate segments made of the electrically insulating material and adapted to cover the power busbars enclosed by the elongated busbar board from behind. A thermal expansion difference caused by different thermal expansion coefficients of the electrically insulating material and of the electrically conductive material is compensated.

19 Claims, 35 Drawing Sheets

ELONGATED BUSBAR BOARD

PRIORITY CLAIM

This application claims priority to European Application No. EP 20181085.0 filed on Jun. 19, 2020. The entire contents of the above-mentioned patent applications are incorporated herein by reference as part of the disclosure of this U.S. application.

BACKGROUND

The invention relates to an elongated busbar board with temperature expansion compensation.

Power busbars are provided to supply devices with electrical power. Conventional busbar systems use busbars with a rectangular cross section for power transmission. These power busbars can for instance be mounted inside of control cabinets. Busbars can be used for single-phase or multi-phase power supply systems. The power busbars of the power busbar system receive the electrical power from an external power supply system. In a conventional power busbar system, it is necessary to provide electrical insulation to protect the user. Conventional power-transmitting busbars can be covered by means of protective covers where no devices are mounted on the busbars. Accordingly, with conventional busbar systems, there is a considerable installation effort for a user because not only electrical devices must be mounted on the busbars but also additional electrical insulating cover elements are electrically attached to the busbars to protect the user.

There is a need to provide a power supply to a power busbar system without occupying available space for the connection of electrical devices to the power busbar system while offering at the same time a user a high level of operational safety when connecting electrical devices to the power busbar system. Further, it is desirable to provide maximum available space for the connection of the electrical devices to the power busbar system. Further it is desired to use the available width of a broad control cabinet (having e.g. a width of 1000 mm or 1200 mm) efficiently and to minimize at the same time the installation efforts of a user assembling the control cabinet. It is in principle possible to connect several short busbar boards in series to cover the whole width of a broad control cabinet, however this requires to install electrical connections between these serial connected relative short busbar boards. This in turn increases the installation effort significantly and can also potentially diminish the security for a user during operation of the control cabinet in case of installation errors. Control cabinets may operate at different ambient temperatures and during operation the temperature within the control cabinet may vary for instance because of dissipation heat caused by the electrical devices.

Accordingly, it is an object of the present invention to provide an elongated busbar board which uses the available space in a control cabinet efficiently and does minimize the installation efforts and/or the security risks for a user at the same time.

This object is achieved according to a first aspect of the present invention by an elongated busbar board comprising the features of claim 1.

The invention provides according to a first aspect an elongated busbar board for connection of devices to a power busbar system, wherein the elongated busbar board comprises a front side touch protection cover plate consisting of touch protection cover plate segments made of an electrically insulating material and having feedthrough openings for electrical connection contacts of devices to be connected to the elongated busbar board, wherein the touch protection cover plate is adapted to cover power busbars made of an electrically conductive material having contact openings lying directly beneath the feedthrough openings of the touch protection cover plate segments and comprises a touch protection base plate connected to said touch protection cover plate and consisting of touch protection base plate segments made of the electrically insulating material adapted to cover the power busbars enclosed by the elongated busbar board from behind, wherein a thermal expansion difference caused by the different thermal expansion coefficients of the electrically insulating material and of the electrically conductive material is compensated by thermal compensation elements.

An advantage of the elongated busbar board is that it provides a user or client with an out-of-the-box busbar system which can be implemented easily and rapidly for any kind of control cabinet configurations with different nominal width ranging e.g. from 500 mm to 1100 mm.

The elongated busbar board according to the first aspect of the present invention has the advantage that the thermal expansion difference which might cause mechanical stress on the structure of the elongated busbar board and/or which can make it difficult to insert electrical connection contacts of devices through to the feedthrough openings of the front side touch protection cover plate into the contact openings of the covered power busbars is considered and compensated by a mechanical compensation mechanism.

In this way, the length of the elongated busbar board is not restricted and can be expanded according to the use case to receive more devices at the front side.

The thermal compensation elements comprise mechanical thermal compensation elements including positioning contours and corresponding counter contours and/or expansion joints between adjacent busbar board segments.

In a possible embodiment of the elongated busbar board according to the first aspect of the present invention, the power busbars are made of an electrically conductive metal having a thermal expansion coefficient being lower than the thermal expansion coefficient of the electrically insulating material of the touch protection cover plate segments and of the touch protection base plate segments.

The thermal expansion coefficients of the touch protection cover plate segments which are made in a possible embodiment by fire-retardant plastic material are considerably higher than the thermal expansion coefficients of electrically conductive metals, e.g. copper, forming the power busbars. With increasing length of the elongated busbar board, i.e. with the increasing number of busbar board segments, the difference in the thermal expansion coefficients becomes more and more noticeable. At some point, the difference in the thermal expansion does lead to unwanted mechanical stress in the mechanical structure of the elongated busbar board and additionally will make it difficult to insert electrical contacts through the feedthrough openings of the touch protection cover plate segments into the receiving contact openings of the covered power busbars lying directly beneath the feedthrough openings of the touch protection cover plate segments.

Accordingly, the elongated busbar board has provisions to compensate the thermal expansion difference caused by the different thermal expansion coefficients of the electrically insulating material, i.e. plastic material, and of the electrically conductive material, i.e. copper material.

In a further possible embodiment of the elongated busbar board according to the first aspect of the present invention, each touch protection cover plate segment is mechanically connected to an associated touch protection base plate segment of the same length to provide a busbar board segment of the elongated busbar board.

The touch protection cover plate segment and the associated touch protection base plate segment may in a further possible embodiment also overlap at least partially.

The number of busbar board segments of the elongated busbar board can vary depending on the use case.

In a further possible embodiment of the elongated busbar board according to the first aspect of the present invention, at a predetermined reference temperature, expansion joints of a predefined width are provided between adjacent busbar board segments of the elongated busbar board.

In a possible embodiment, the reference temperature $T_{ref}$ is 25° C. At this temperature, the expansion joints provided between the adjacent busbar board segments have a predefined width which is sufficient to allow the busbar board segments to expand in response to an increased temperature without being pressed against the adjacent busbar board segments causing undesired mechanical stress within the structure of the elongated busbar board.

In a further possible embodiment of the elongated busbar board according to the first aspect of the present invention, the elongated busbar board comprises at its distal ends two lateral busbar board segments surrounding a predetermined number of intermediate busbar board segments. In a possible implementation, the length of the lateral busbar board segments exceeds the length of the intermediate busbar board segments.

In a further possible embodiment of the elongated busbar board according to the first aspect of the present invention, each power busbar comprises at its rear side equidistant positioning contours to place a respective power busbar on corresponding positioning contours of the touch protection base plate segments fixed to associated touch protection cover plate segments to align the feedthrough openings of the touch protection cover plate segments with the equidistant contact openings of the power busbars.

In a further possible alternative embodiment of the elongated busbar board according to the first aspect of the present invention, each power busbar comprises at its front side positioning contours to align the feedthrough openings of the touch protection front plate segments with the equidistant contact openings of the power busbars covered by the touch protection front plate segments.

In a further possible embodiment of the elongated busbar board according to the first aspect of the present invention, the contact openings of the power busbars are spaced apart from each other equidistantly in a predefined spacing grid.

In a still further possible embodiment of the elongated busbar board according to the first aspect of the present invention, the feedthrough openings of the touch protection cover plate segments are spaced apart from each other in the same predefined spacing grid as the contact openings of the power busbars.

In a further possible embodiment of the elongated busbar board according to the first aspect of the present invention, a power feed-in of electrical power into the power busbars enclosed by the elongated busbar board is provided by power feed-in plugs being pluggable into the elongated busbar board.

In a possible embodiment, the power feed-in plugs can be plugged into the rear side of the elongated busbar board, i.e. into at least one touch protection base plate segment of the elongated busbar board. In a further possible embodiment, the power feed-in plugs can also be plugged into a socket provided at the lateral side of the elongated busbar board.

In a still further alternative embodiment, the power feed-in plugs can also be plugged into the front side of the elongated busbar board, i.e. into sockets of at least one front side touch protection cover plate segment of the elongated busbar board.

The invention provides according to a further aspect an elongated busbar board for connection of devices to a power busbar system, wherein the elongated busbar board comprises a front side touch protection cover plate having feedthrough openings for electrical connection contacts of devices to be connected to the busbar board, wherein the touch protection cover plate is adapted to cover power busbars having contact openings lying directly beneath the feedthrough openings of the touch protection cover plate and comprising a touch protection base plate connected to said touch protection cover plate, wherein the touch protection base plate covers the power busbars enclosed by the elongated busbar board from behind, wherein a power feed-in of power into the power busbars enclosed by the busbar board is provided by power feed-in plugs being pluggable into the elongated busbar board, wherein a thermal expansion difference caused by the different thermal expansion of the touch protection plates on the enclosed power busbars is compensated.

In a possible embodiment of the elongated busbar board according to the first aspect of the present invention, it is provided by the power feed-in of the electrical power from the rear side such that the front side of the elongated busbar board can be covered completely by connected electrical devices without wasting any of the available space at the front side of the elongated busbar board.

A power feed-in of electrical power from the rear side provides additional protection to a user installing electrical devices to the power busbar system from the front side.

Further, if the power feed-in plugs are plugged into corresponding sockets within the touch protection base plate at the rear side of the elongated busbar board, the connection of the elongated busbar board to an external power supply system can be performed quite easily and fast.

In a possible embodiment of the elongated busbar board according to the first aspect of the present invention, the elongated busbar board can be attached to a mounting plate.

The elongated busbar board according to the first aspect of the present invention can also be attached to a mounting frame.

Both the mounting plate and the mounting frame can be provided within a control cabinet.

In a possible embodiment of the elongated busbar board according to the first aspect of the present invention, the elongated busbar board comprises several elongated electrically conductive power busbars which are arranged in parallel and which are connectable by means of associated feed-in plugs to provide a power feed-in.

The conductive power busbars are encapsulated by the elongated busbar board to provide protection to the user.

In a further possible embodiment of the elongated busbar board according to the first aspect of the present invention, the power busbars arranged within the elongated busbar board comprise each a U-shaped cross profile with sidewalls facing each other and the sidewalls being connected with each other by means of a connecting bridge, which comprises contact openings for insertion of resilient electrical connection contacts of devices to be connected to the elongated busbar board from the front side.

Accordingly, the power busbars encapsulated by the elongated busbar board according to the first aspect of the present invention are in a possible embodiment not conventional power busbars with a rectangular cross section but have a specific shape allowing the reception of resilient electrical connection contacts of devices inserted through feedthrough openings of the front side touch protection cover plate and into contact openings of the covered power busbars to establish an electrical connection.

In a further possible embodiment of the elongated busbar board according to the first aspect of the present invention, the power feed-in plugs comprise contact tongues facing each other.

The contact tongues of the power feed-in plugs can abut one or both sidewalls of the corresponding power busbar from the inside or outside.

In an alternative implementation, the contact tongues of the power feed-in plugs can be lyra-shaped to embrace one or both sidewalls of a corresponding power busbar to provide an electrical contact.

In a further possible embodiment of the elongated busbar board according to the first aspect of the present invention, the power feed-in plugs which are provided for the feed-in of electrical power into the different power busbars enclosed by the elongated busbar board are fixed at the rear side to feed-in lamellae or to feed-in circular conductors by means of an associated clamp connection or screw connection which can be covered by a cover hood.

In a further possible embodiment of the elongated busbar board according to the first aspect of the present invention, the power feed-in plugs which are provided for feed-in of electrical power into the different power busbars enclosed by the elongated busbar board are connected to feed-in power busbars which are directed crosswise to the power busbars enclosed by the elongated busbar board.

In a further possible embodiment of the elongated busbar board according to the first aspect of the present invention, the power feed-in plugs provided for the feed-in of electrical power into the different power busbars enclosed by the elongated busbar board comprise each lyra-shaped resilient flexible contact tongues wherein the contact tongues face each other and abut the associated feed-in power busbars to establish an electrical contact.

In a further possible embodiment of the elongated busbar board according to the first aspect of the present invention, the feed-in power busbars are attached by means of at least one busbar support element to a strut of a mounting frame or to a mounting plate to provide a mechanical support connection.

In a possible embodiment, the feed-in power busbars can be covered by isolating cover elements and/or can comprise an electrical isolation of another kind.

In a further possible embodiment of the elongated busbar board according to the first aspect of the present invention, the touch-protected feed-in power busbars are oriented in a vertical direction and are attached by means of at least one busbar support element to a parallel vertical strut of the mounting frame or are attached to a mounting plate for providing mechanical support connection.

In a further possible embodiment of the elongated busbar board according to the first aspect of the present invention, the busbar support element is adapted to receive feed-in power busbars with different cross sections and comprises corresponding mechanical adjustment elements.

In a further possible embodiment of the elongated busbar board according to the first aspect of the present invention, the mounting frame comprises at least two parallel struts which are connected to each other by means of one or more cross-struts.

In a further possible embodiment of the elongated busbar board according to the first aspect of the present invention, the elongated busbar board can be attached mechanically to counter-contours of the mounting frame or to counter-contours of the mounting plate by means of bracket elements, angled elements, adapter elements and/or latching elements.

In a still further possible embodiment of the elongated busbar board according to the first aspect of the present invention, the power feed-in plugs which are provided for the feed-in of electrical power into the different power busbars enclosed by the elongated busbar board are integrated in a multipole feed-in plug module.

In a further possible embodiment of the elongated busbar board according to the first aspect of the present invention, the front side touch protection cover plate of the elongated busbar board can be covered completely with devices having electrical connection contacts passing through the feedthrough openings of the touch protection cover plate into underlying contact openings of a contact opening grid of the power busbars enclosed by the elongated busbar board to establish an electrical connection.

In a further possible embodiment of the elongated busbar board according to the first aspect of the present invention, the busbar board consists of several assembled busbar board segments wherein each busbar board segment comprises a touch protection cover plate segment and a touch protection base plate segment which are connected to each other mechanically.

In a further possible embodiment of the elongated busbar board according to the first aspect of the present invention, the power feed-in for the power busbars by means of the feed-in plugs is performed by means of load break switches and/or current protection elements located at the rear side of the elongated busbar board and which can be operated from the front side or can be controlled by means of a control device connected to the front side of said elongated busbar board.

In a further possible embodiment of the elongated busbar board according to the first aspect of the present invention, the current protection elements comprise controllable electronic current protection elements and/or current protection fuses.

In a further possible embodiment of the elongated busbar board according to the first aspect of the present invention, the touch-protected elongated busbar board comprises besides the power busbars electrical data lines for providing communication between the devices connected to the power busbars.

In a further possible embodiment of the elongated busbar board according to the first aspect of the present invention, the devices connected to the power busbar system can communicate directly with each other by means of power-line communication via the power busbars enclosed by the touch-protected elongated busbar board.

In a further possible alternative embodiment of the elongated busbar board according to the first aspect of the present invention, the devices connected to the busbar system can communicate with each other via wireless radio interfaces.

In a further possible embodiment of the elongated busbar board according to the first aspect of the present invention, the feed-in plugs, the feed-in plug module and/or the touch-protected elongated busbar board can comprise measuring modules provided for performing a current and/or voltage measurement to generate measurement values or sensor data output by means of data interfaces.

In a still further possible embodiment of the elongated busbar board according to the first aspect of the present invention, the touch-protected elongated busbar board comprises in addition to the power busbars electrical supply lines or supply busbars for supplying measuring modules or transceivers provided within the touch-protected elongated busbar board and/or devices connected to the touch-protected elongated busbar board with auxiliary supply voltages which are received by means of the feed-in plugs or generated by transforming the feed-in power.

In a further possible embodiment of the elongated busbar board according to the first aspect of the present invention, the touch-protected elongated busbar board comprises mechanical connection elements used for connecting the elongated busbar board with other busbar boards.

In a still further possible embodiment of the elongated busbar board according to the first aspect of the present invention, the elongated busbar board is connectable without using a mechanical tool to corresponding counter-contours of a mounting plate or of a mounting frame.

In a further possible embodiment of the elongated busbar board according to the first aspect of the present invention, the feed-in plugs plugged into the elongated busbar board are mechanically lockable.

In a still further possible embodiment of the elongated busbar board according to the first aspect of the present invention, the elongated busbar board comprises an elongated shape, wherein wiring comb elements are attachable to one or both long sides of the elongated busbar board.

The invention further provides according to a further aspect a control cabinet comprising the features of claim 19.

The invention provides according to a second aspect a control cabinet with a control cabinet housing which comprises at least one mounting plate and/or at least one mounting frame used for mounting at least one or more elongated busbar boards according to the first aspect of the present invention.

In the following, possible embodiments of the different aspects of the present invention are described in more detail with reference to the enclosed figures.

FIG. 25 shows a rear side view on an elongated busbar board according to the present invention using feed-in circular conductors for power supply feed-in;

Figure 1:
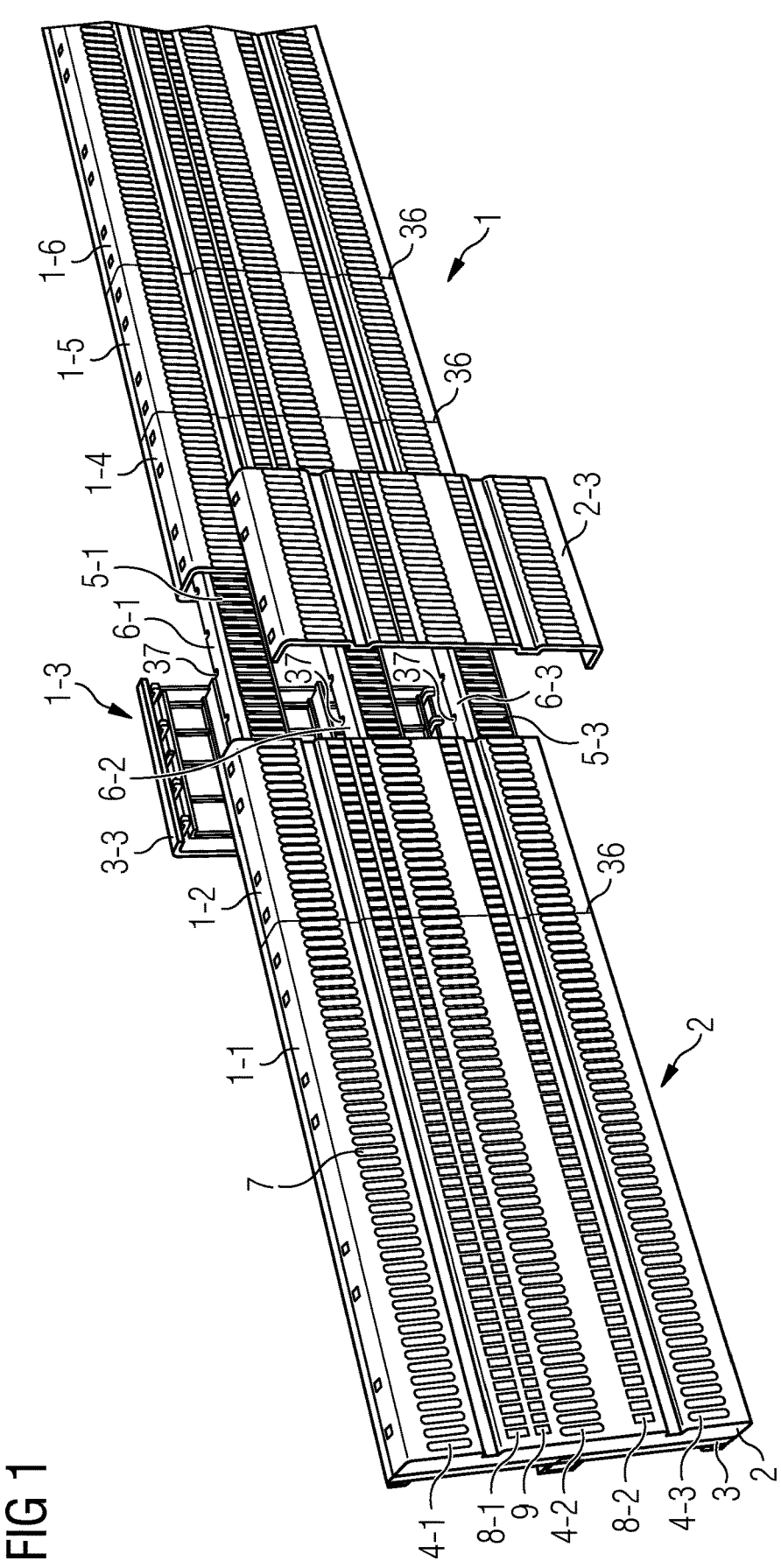
FIG. 1 shows a perspective view on a possible embodiment of an elongated busbar board according to the first aspect of the present invention.
Figure 19:
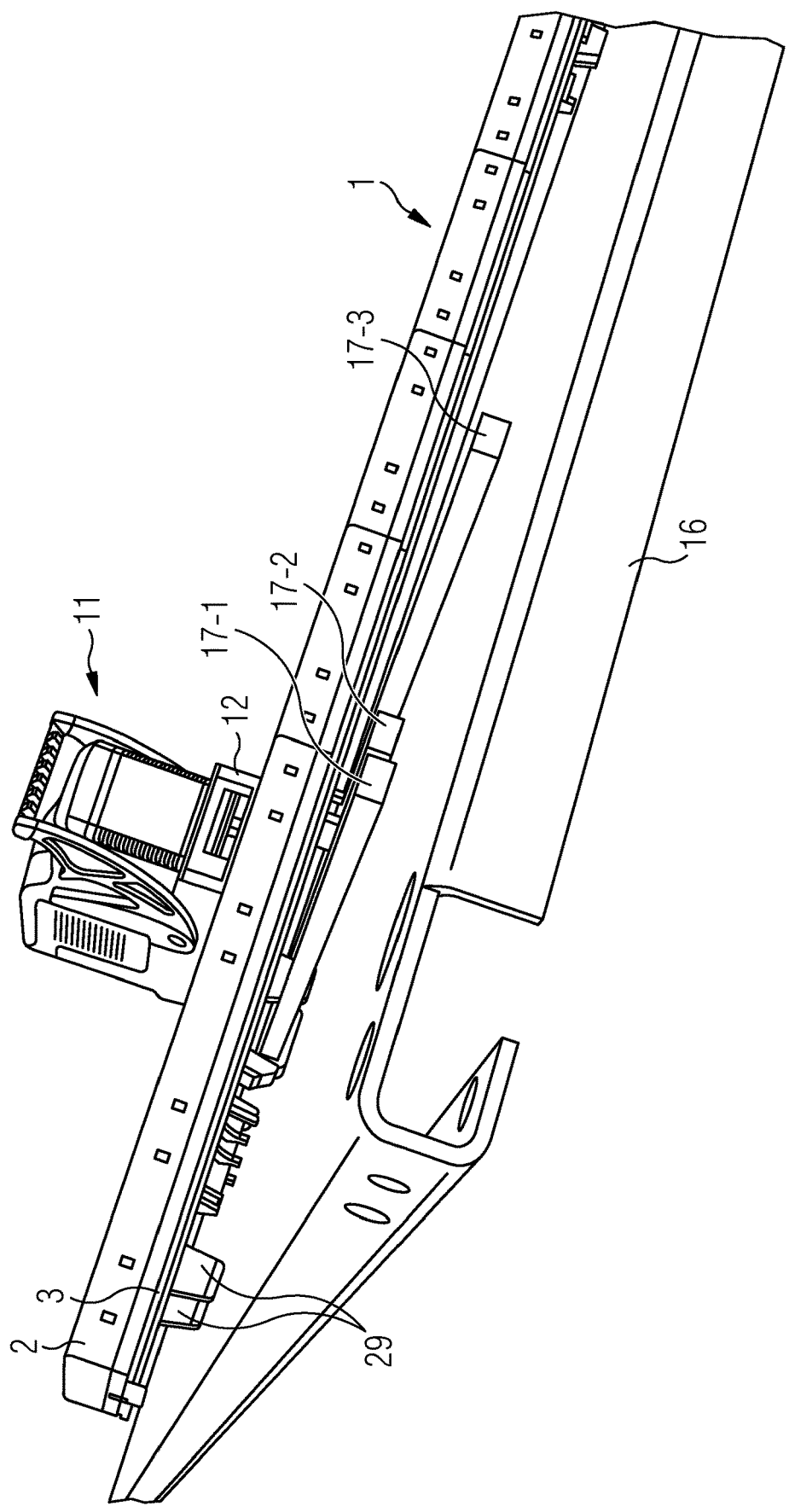
FIG. 19 shows a view for illustrating an elongated busbar board according to the present invention mounted to a mounting plate and provided for receiving electrical devices at the front side.

As can be seen from the perspective front side view illustrated in FIG. 1, an elongated busbar board 1 according to the first aspect of the present invention can comprise several busbar board segments 1-*i* encapsulating power busbars 6 of a power busbar system as also illustrated in FIGS. 28 to 34. The busbar board 1 comprises an elongated shape, i.e. its length exceeds its height. In the illustrated embodiment of FIG. 1, the elongated busbar board 1 comprises a front side touch protection cover plate 2 with one or more segments connected mechanically to a touch protection base plate 3 having also one or more segments which cover the power busbars enclosed by the elongated busbar board 1 from behind. The front side touch protection cover plate 2 can be used for connecting a plurality of electrical devices 11 (as shown in FIG. 19) to the power busbars 6 enclosed by the elongated busbar board 1. In the illustrated embodiment of FIG. 1, the elongated busbar board 1 is provided for encapsulating at least three power busbars 6 which run in parallel within the elongated busbar board 1. The front side touch protection cover plate 2 has several rows 4-1, 4-2, 4-3 of feedthrough openings or slots 7 extending in parallel to the enclosed power busbars 6 provided within the touch-protected elongated busbar board 1. In the illustrated embodiment of FIG. 1, the elongated busbar board 1 is provided for providing touch protection of three enclosed power busbars 6-1, 6-2, 6-3. Accordingly, the elongated busbar board 1 has a corresponding number of three rows 4-1, 4-2, 4-3 of equidistant feedthrough openings 7. Each row 4-$i$ comprises a plurality of feedthrough openings 7 which can be used to establish electrical connection between connection contacts of electrical devices 11 to be connected to the power busbar system and the touch-protected power busbars 6 enclosed by the elongated busbar board 1. The touch protection cover plate 2 is adapted to cover the power busbars 6 each having a plurality of contact openings 5 lying directly beneath the corresponding feedthrough openings 7 of the touch protection cover plate 2 as illustrated in FIG. 1. Accordingly, each segment 1-$i$ of the elongated busbar board 1 comprises a front side touch protection cover plate segment 2-$i$ and a touch-protected base plate segment 3-$i$ which can be connected with each other mechanically as also illustrated in more detail in FIG. 2 and in FIGS. 28 to 34. The front side touch protection cover plate 2 covers the power busbars 6 from the front side. In contrast, the touch protection base plate 3 covers the power busbars 6 enclosed by the elongated busbar board 1 from behind.

Figure 9:
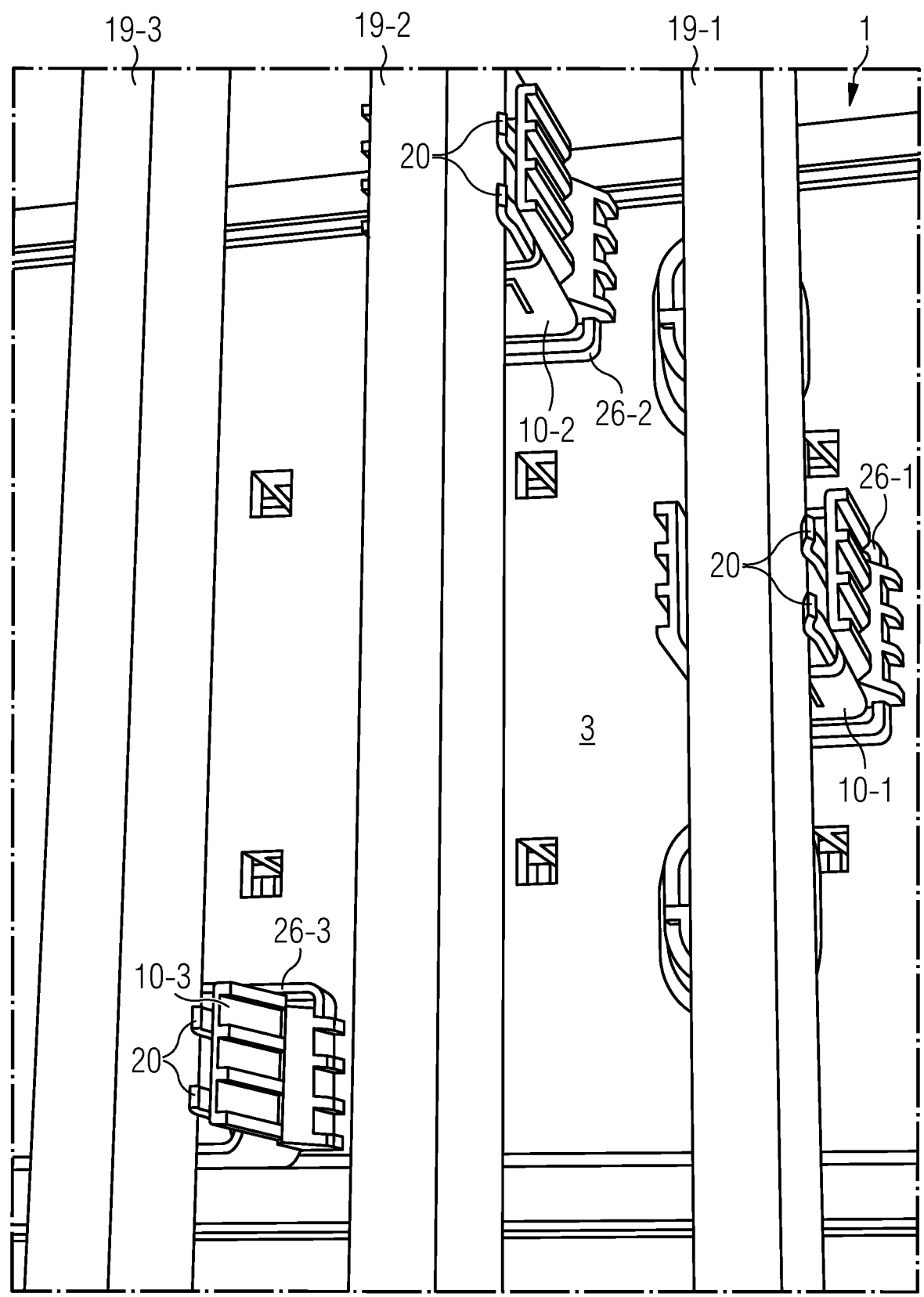
FIG. 9 illustrates a power feed-in by means of power feed-in plugs provided at the rear side of an elongated busbar board according to the present invention receiving power from external feed-in power busbars attached to a mounting frame.
Figure 14:
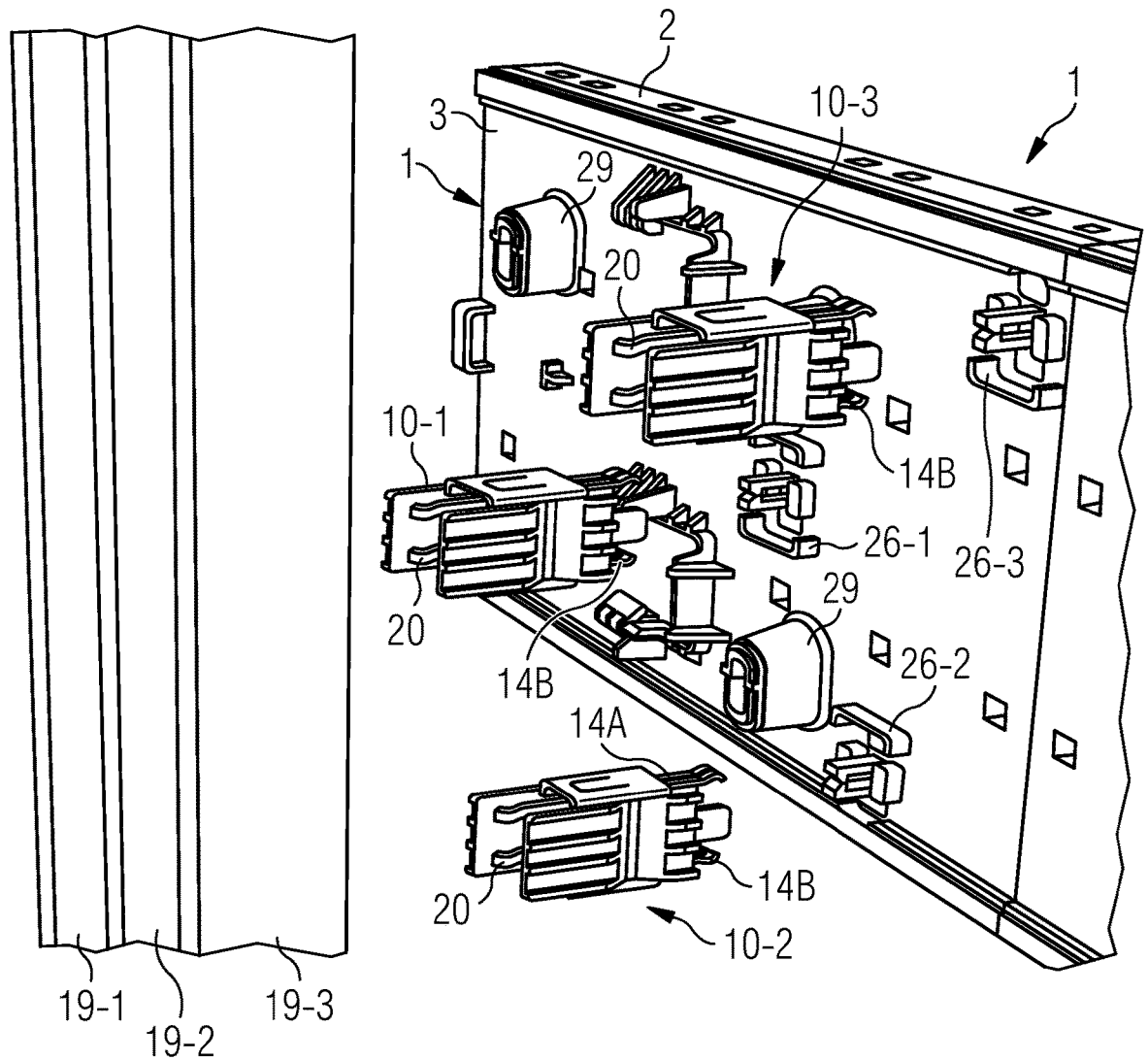
FIG. 14 shows a further view for illustrating a power feed-in by means of power feed-in plugs.

The power feed-in of electrical power into the power busbar 6 enclosed by the elongated busbar board 1 is provided by power feed-in plugs 10 being pluggable into corresponding sockets of the touch protection base plate 3 of the elongated busbar board 1 as illustrated in more detail for example in FIG. 9 and FIG. 14.

A connection between the touch protection cover plate segment 2-$i$ and the associated touch protection base plate segment 3-$i$ can also be achieved in a possible embodiment by a common intermediate connection element.

Figure 4:
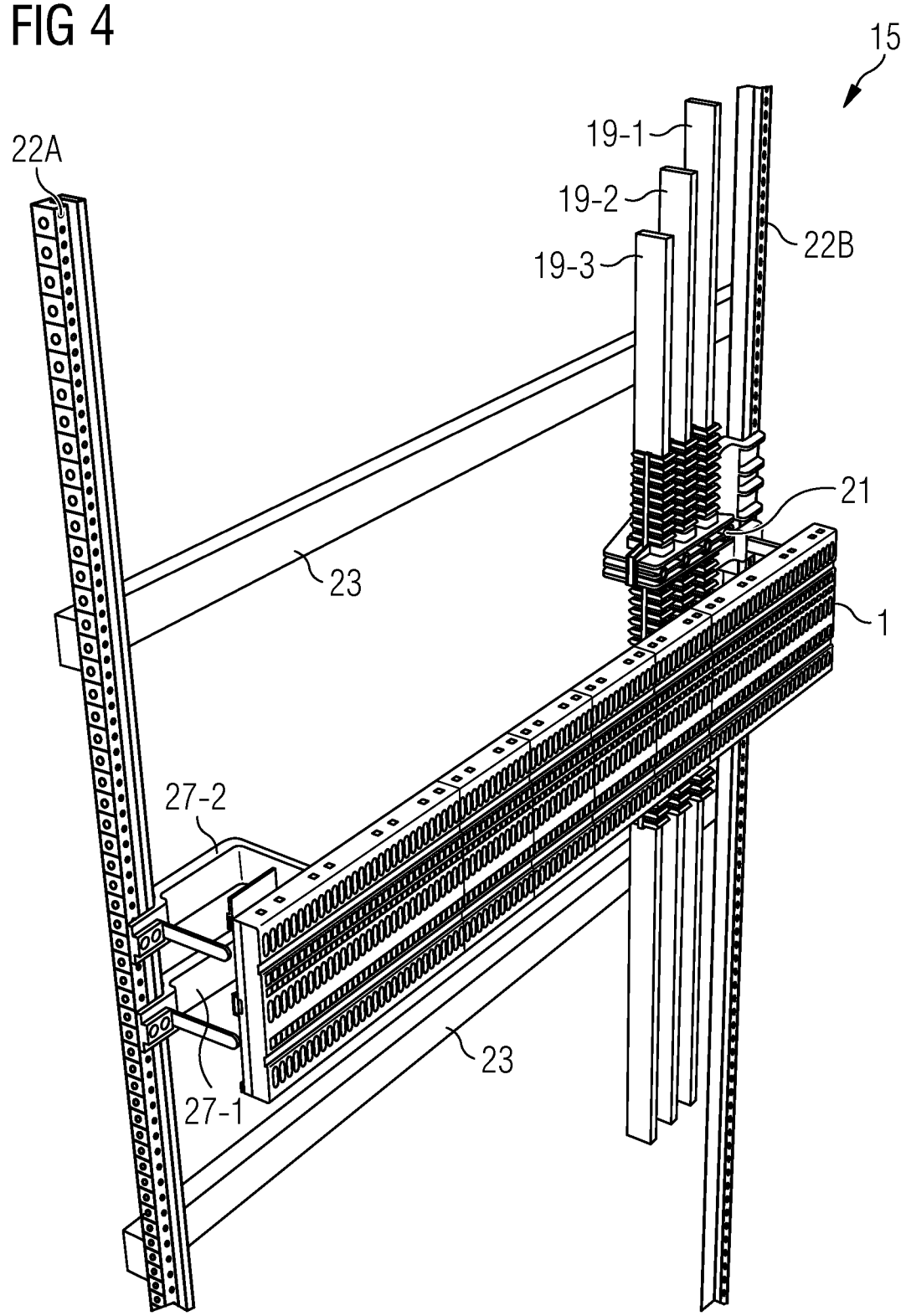
FIG. 4 shows a possible embodiment where the elongated busbar board according to the present invention is attached to a mounting frame.
Figure 5:
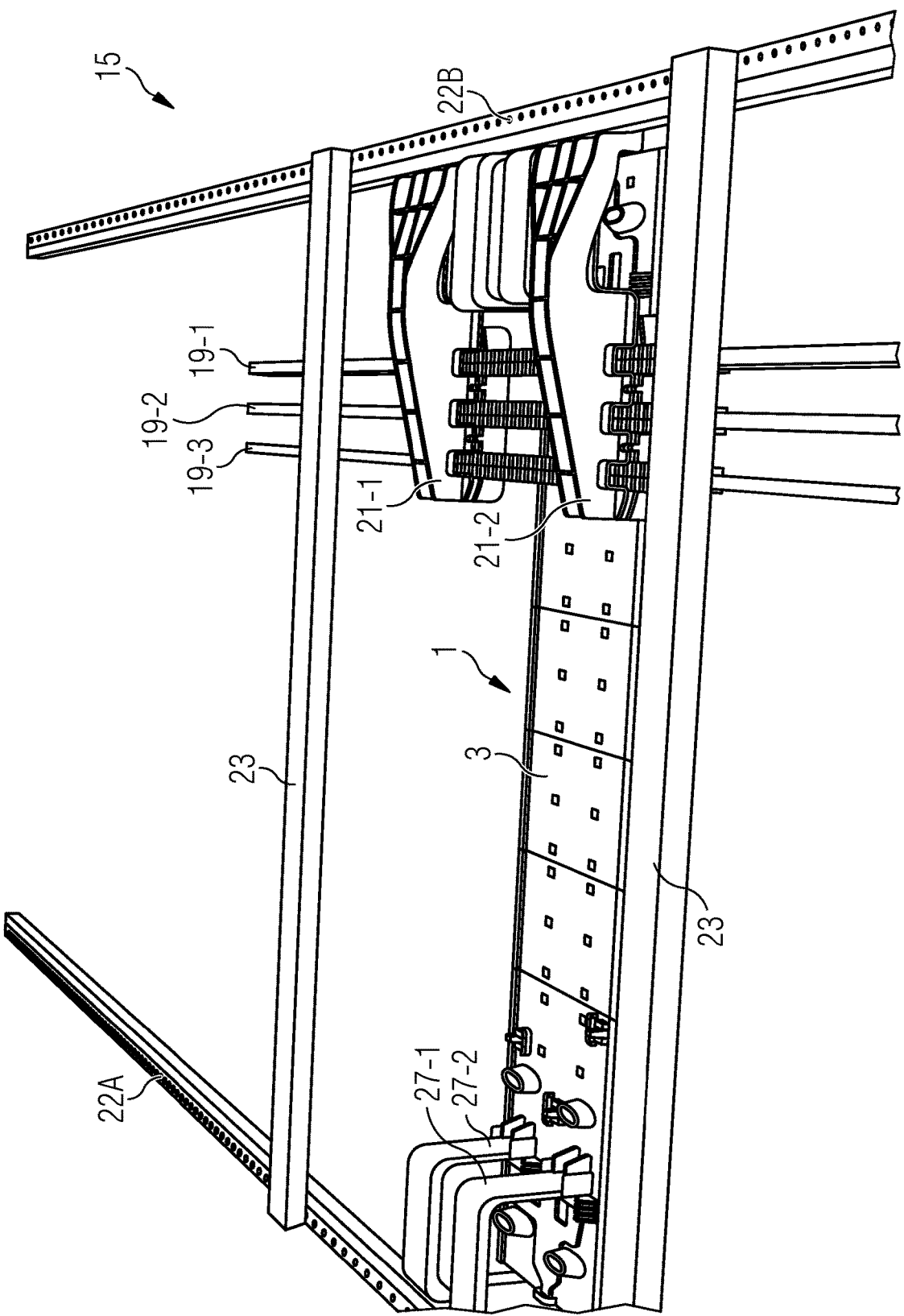
FIG. 5 shows a further view on an elongated busbar board connected to a mounting frame.
Figure 6:
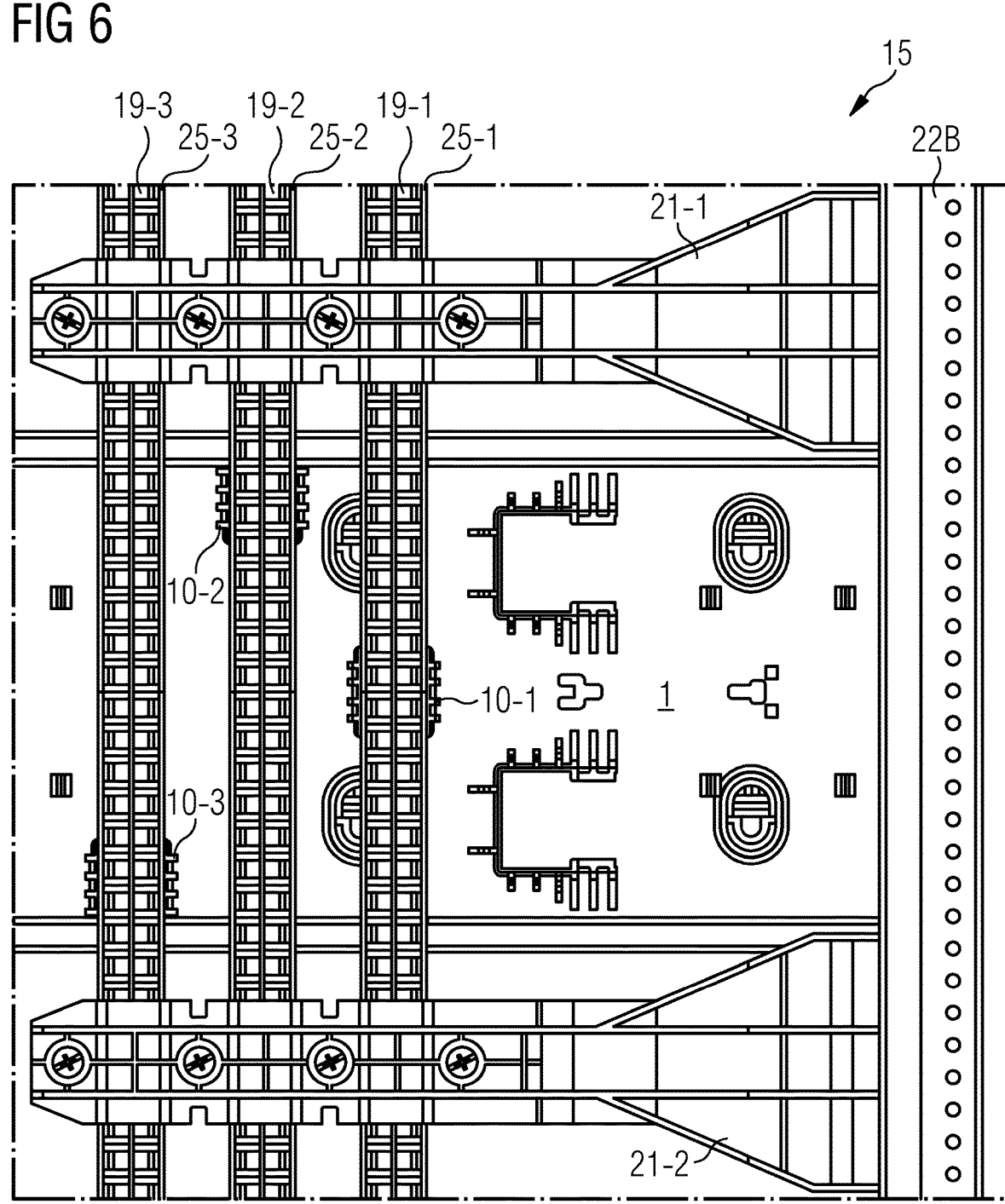
FIG. 6 shows a rear view of an elongated busbar board connected to a mounting frame.
Figure 17:
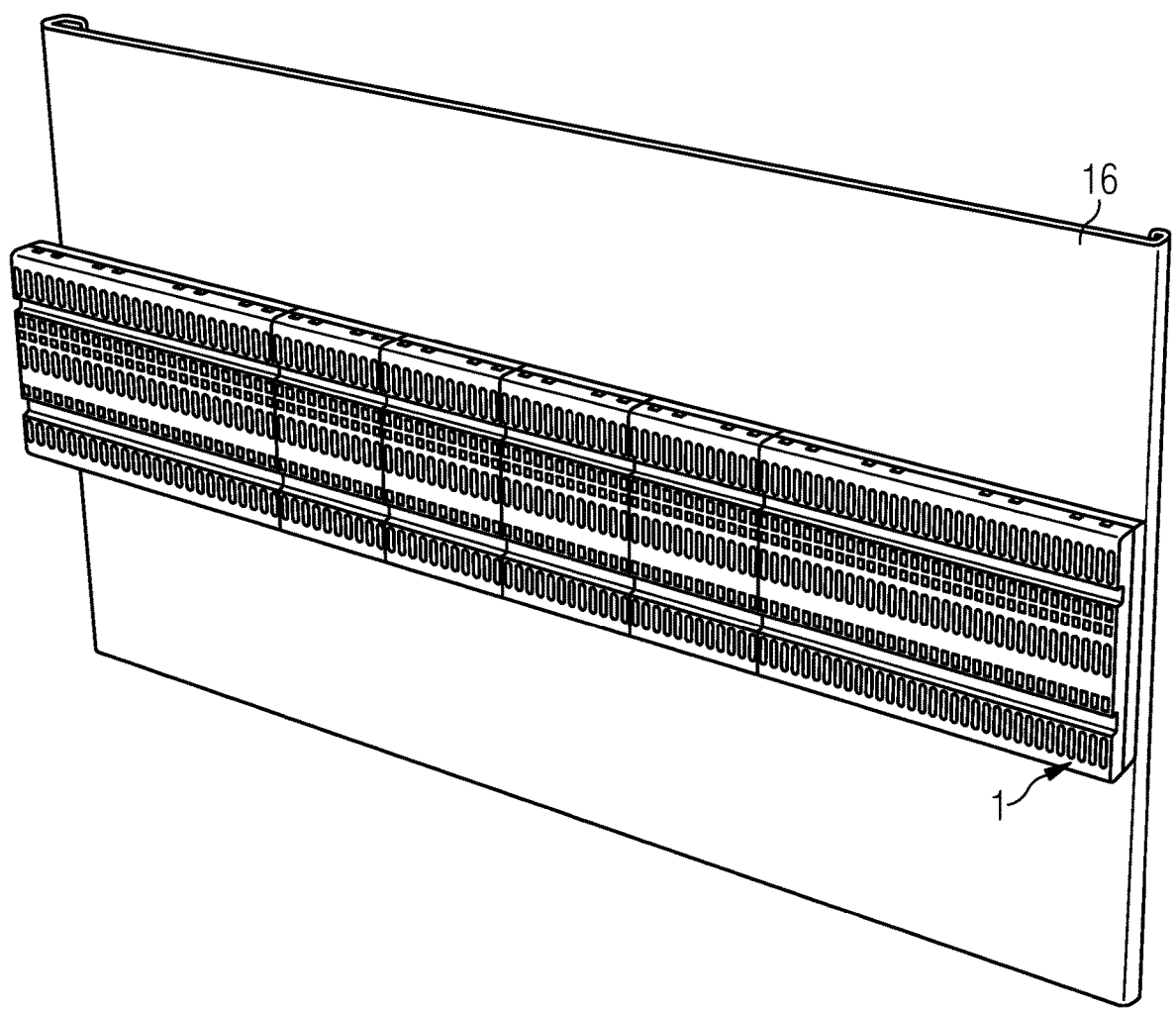
FIG. 17 shows an embodiment where an elongated busbar board according to the present invention is connected to a mounting plate.

The elongated busbar board 1 as shown in FIG. 1 can in a possible implementation be attached to a mounting frame 15 as illustrated in FIGS. 4, 5 or to a mounting plate 16 as illustrated in FIG. 17. The elongated busbar board 1 shown in FIG. 1 comprises several elongated electrically conductive power busbars 6 which are arranged in parallel and which are connectable by means of associated feed-in plugs 10 from behind to provide a rear side power feed-in. In a possible embodiment, the power busbars 6 arranged within the elongated busbar board 1 each comprises a U-shaped cross profile as also visible in FIG. 2. The power busbars 6 having the U-shaped cross profile comprise sidewalls 6A, 6B facing each other. The sidewalls 6A, 6B of each U-shaped power busbar 6 are connected with each other by means of a connecting bridge 6C. The connecting bridge 6C comprises the contact openings 5 for insertion of resilient electrical connection contacts 13A and their neighboring protection ribs 13B of a device 11 to be connected to the elongated busbar board 1 from the front side. Each electrical contact 13A is in a possible implementation surrounded by neighboring protection ribs 13B at its left and right side. The two protection ribs 13B of an electrical contact 13A protects this electrical contact 13A against mechanical damage and provide additional mechanical support of an inserted electrical device 11.

In an alternative embodiment, the power busbar 6 can also comprise another cross-section shape, in particular a rectangular cross-section shape, but comprise in any case contact openings 5.

Figure 2:
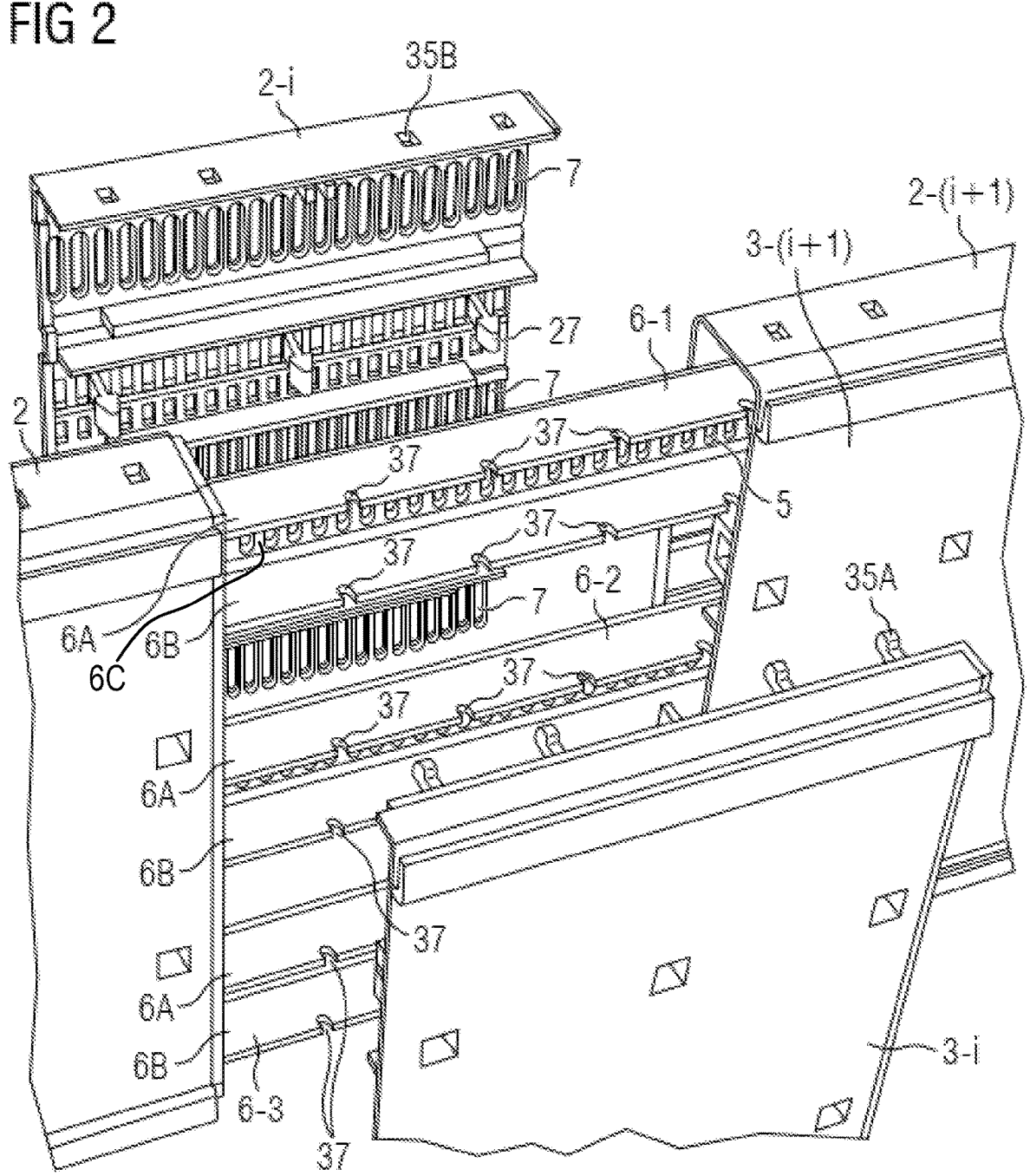
FIG. 2 shows a detailed view on the busbar board segments of the elongated busbar board illustrated in FIG. 1.
Figure 11:
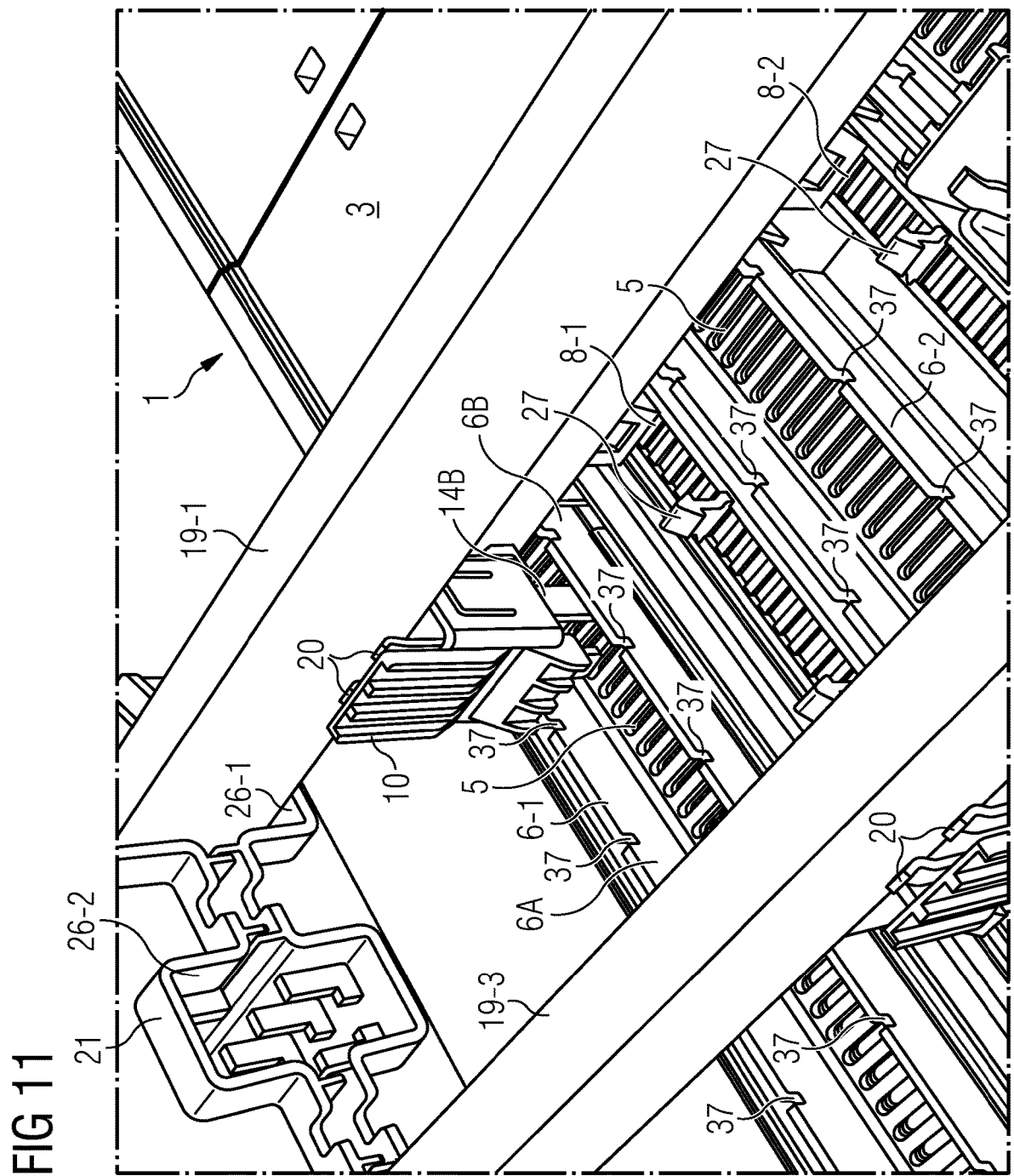
FIG. 11 shows a view for illustrating the electrical connection between an external feed-in power busbar with an internal power busbar encapsulated by the elongated busbar board according to the present invention by means of a power feed-in plug.

As illustrated in FIGS. 1, 2, the elongated busbar board 1 consists of a front side touch protection cover plate 2 and a touch protection base plate 3 which are both firmly connected to each other. In a possible implementation, the front side touch protection cover plate 2 is clipped into clipping holes 35B of the touch protection base plate 3 by means of clip connections 35A as shown in FIG. 2 and by means of arrow-shaped clipping hooks 27 as shown in FIG. 2 and FIG. 11. In alternative implementations, the front side touch protection cover plate segments 2-$i$ and the rear side touch protection base plate segments 3-$i$ can also be screwed to each other or clued to each other. Both the front side touch protection cover plate 2 and the touch protection base plate 3 are made of an electrically insulating material. In a possible implementation, the front side touch protection cover plate 2 and the rear side touch protection base plate 3 can be fabricated of flame-retardant plastic. The electrically insulating flame-retardant plastic material of the front side touch protection cover plate 2 and the rear side touch protection base plate 3 has a relatively high thermal conductivity for dissipating heat.

Figure 28:
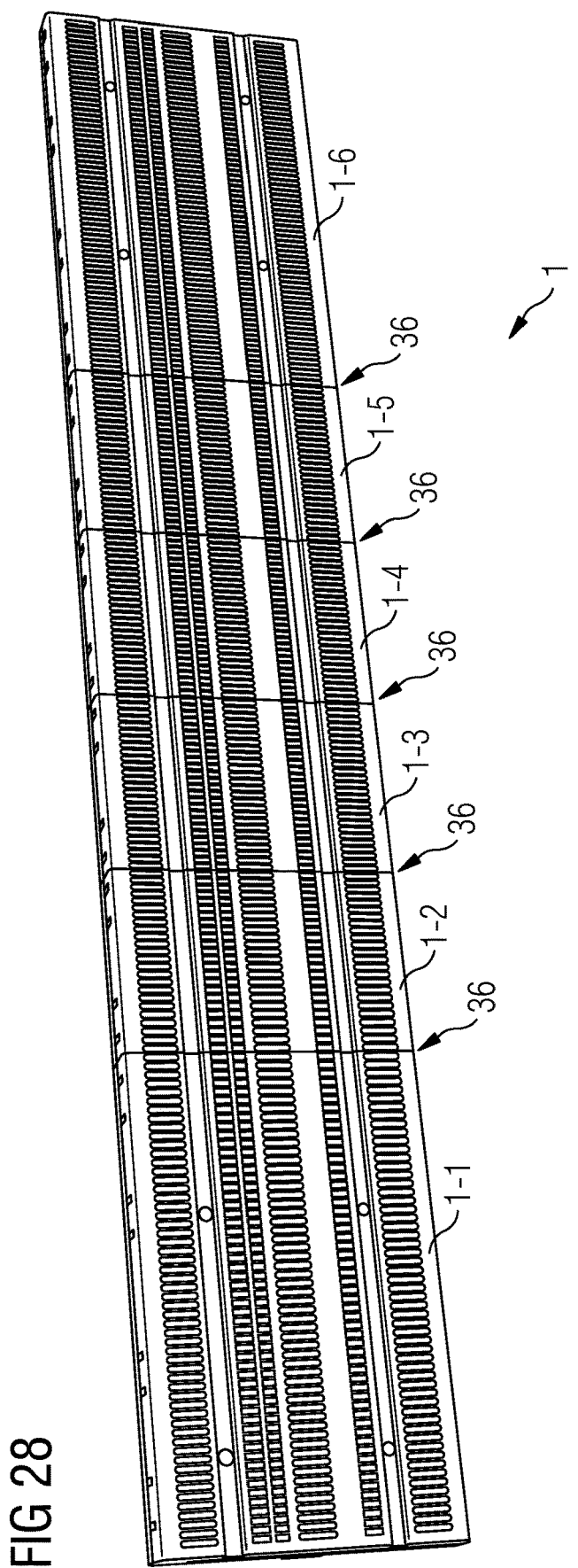
FIGS. 28 to 34 show views for illustrating a possible exemplary embodiment of an elongated busbar board according to the present invention.
Figure 29:
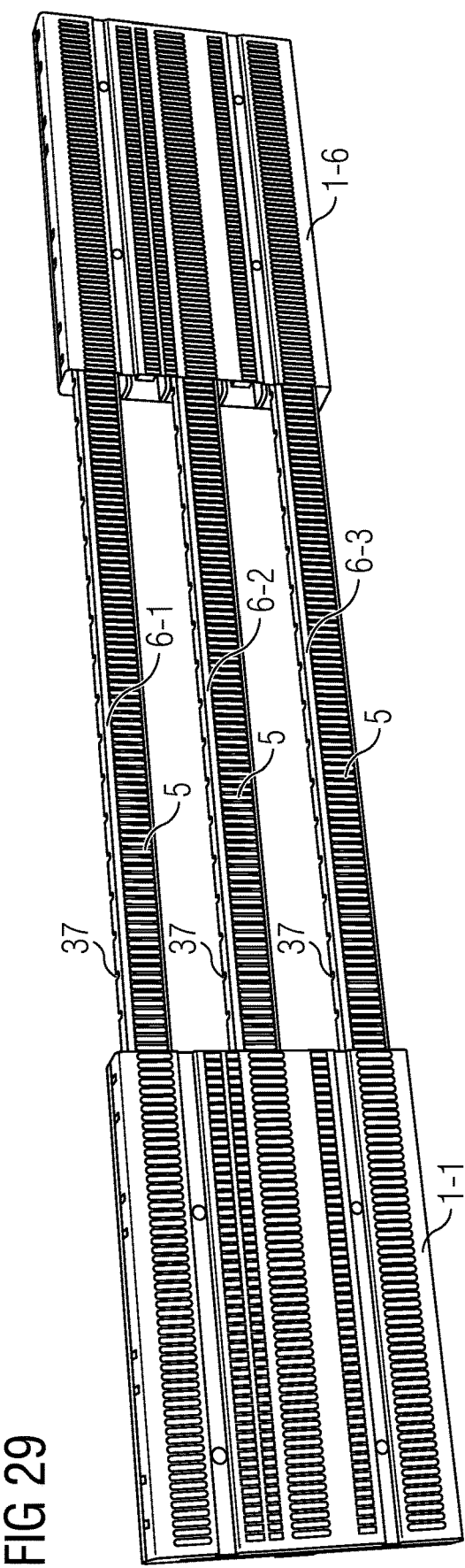
Figure 30:
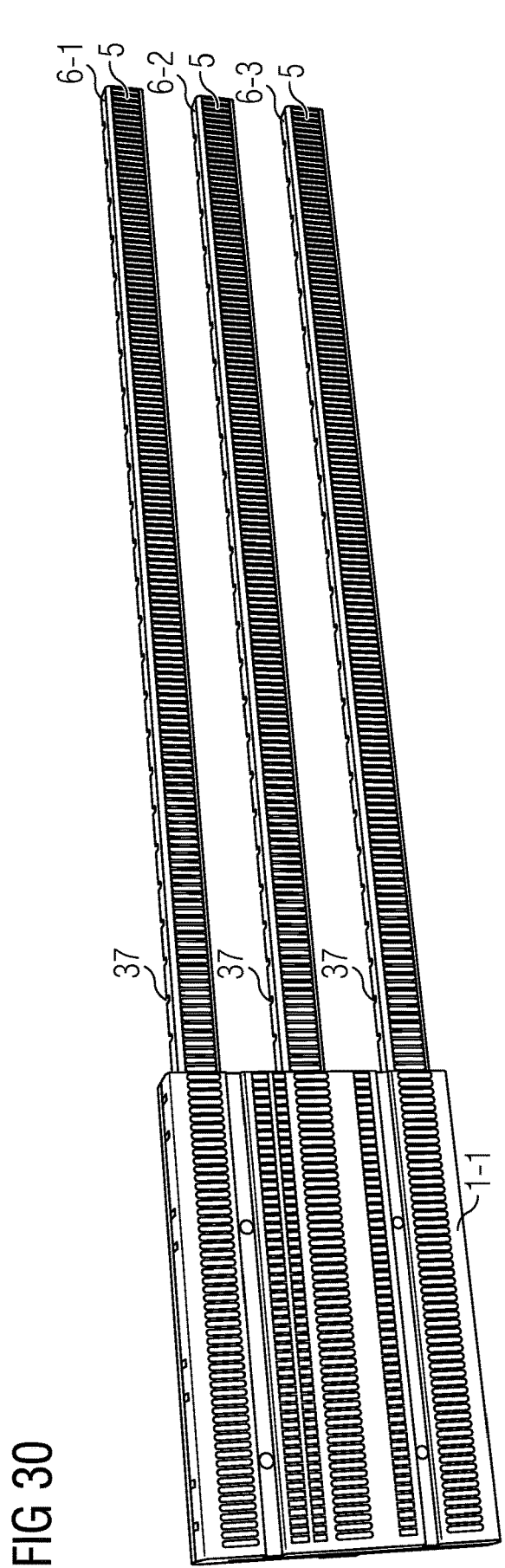
Figure 31:
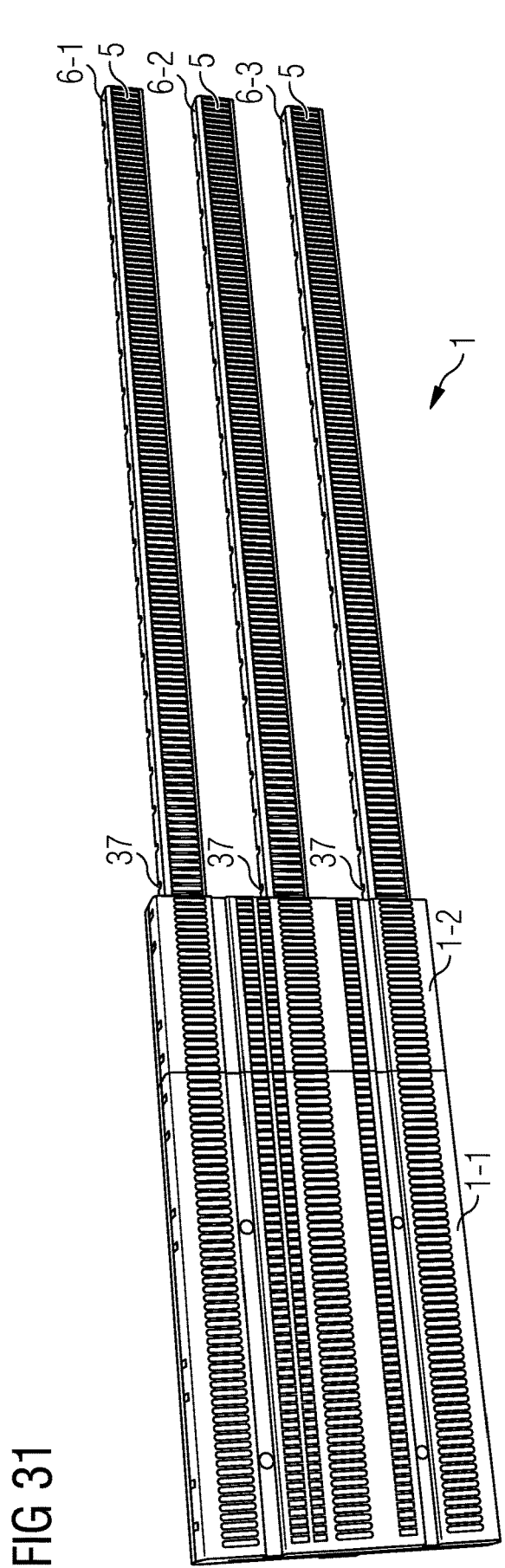
Figure 32:
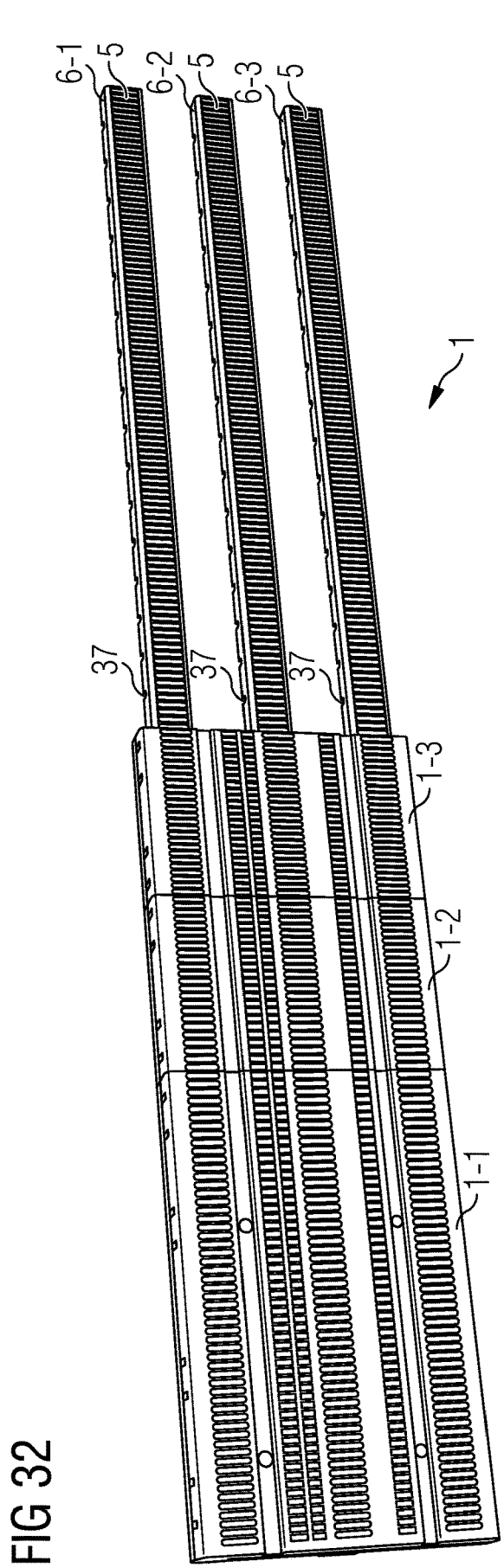
Figure 33:
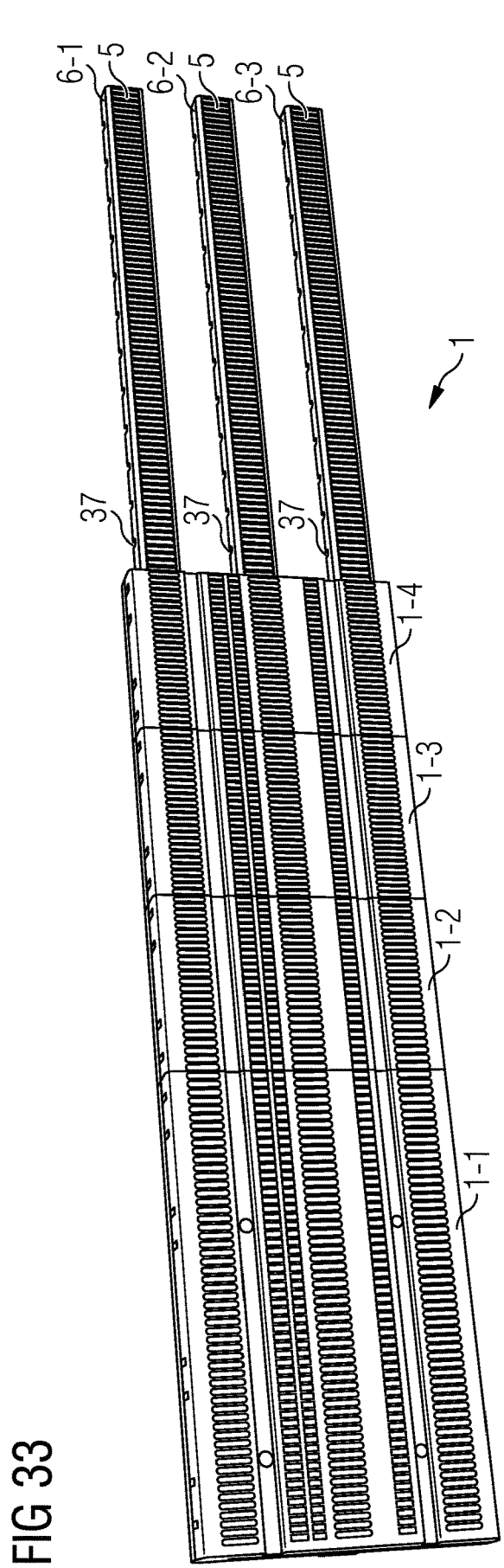
Figure 34:
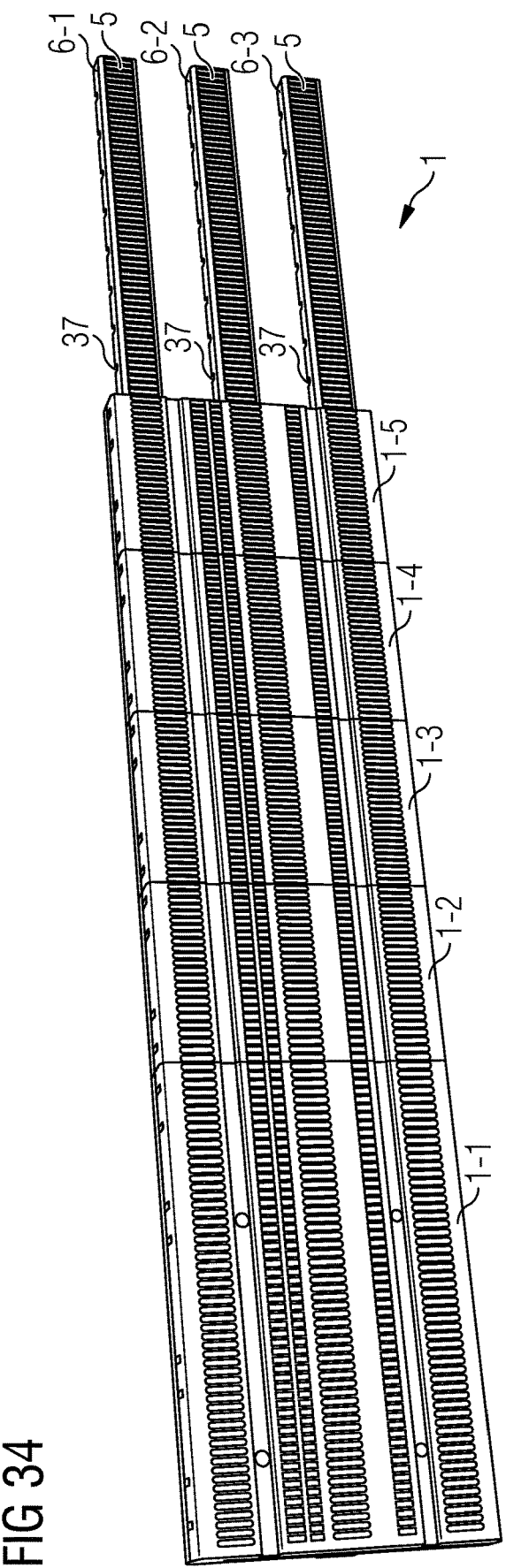

The elongated busbar board 1 as illustrated in FIG. 1 comprises several busbar board segments 1-$i$ as also illustrated in FIGS. 28 to 33. In the illustrated embodiment of FIGS. 28 to 33, the elongated busbar board 1 comprises six busbar board segments 1-$i$. The elongated busbar board 1 comprises in the illustrated embodiment at its distal ends two lateral busbar board segments 1-1 and 1-6 surrounding a predetermined number of four intermediate busbar board segments 1-2 to 1-5. The length of the busbar board segments 1-$i$ can vary depending on the use case. In the shown embodiment of FIGS. 28 to 33, the two lateral busbar board segments 1-1, 1-6 have a higher length than the intermediate busbar board segments 1-2, 1-3, 1-4, 1-5. In a possible implementation, the two lateral busbar board segments 1-1, 1-6 have a length of 250 mm and the intermediate busbar board segments 1-2, 1-3, 1-4, 1-5 each comprise a length of 100 mm. Accordingly, in total, the enlarged busbar board segments shown in FIG. 28 comprise a length of 2×250 mm+4×100 mm=900 mm. The elongated busbar board 1 as shown in FIGS. 1, 28 are used for connection of a plurality of devices 11 of a power busbar system. Because of its considerable length, the elongated busbar board 1 can be used for the connection of a huge number of devices 11 to the power busbar system.

The nominal length of the elongated busbar board 1 consisting of busbar board segments 1-$i$ can e.g vary between 500 mm and 1100 mm. For instance, the elongated busbar board 1 may have a length of 500, 600, 700, 800, 900, 1000 or 1100 mm corresponding to the nominal width of different kinds of control cabinets.

The power busbars 6 enclosed by the busbar board segments 1-$i$ are made of an electrically conductive material, i.e. copper. In contrast, the touch protection segments 1-$i$ of the elongated busbar board 1 are made of electrically insulating flame-retardant plastic material having a different thermal expansion coefficient than a copper. Thermal expansion is the tendency of materials to expand when they heat up. When materials absorb thermal energy their molecules enter into an excited state. Molecules may start to shift position and move away from each other causing the material to expand. The coefficient of thermal expansion is inversely proportional to the bond strength of the material and depends on a melting point of the material. Hence, polymers with weak secondary intermolecular bonds (low melting points) comprise high expansion coefficients. In contrast, ceramics which are strongly bonded normally provide low thermal expansion coefficients. Further, metals with high melting points (strong bonding) have comparatively low thermal expansion coefficients. In contrast, low melting point metals may comprise higher thermal expansion coefficients. In any case, the thermal expansion of plastic materials are considerably higher than the expansion coefficients of electrically conductive metals. The linear thermal expansion coefficients of metals including aluminium, steel, bronze, iron, brass, copper, gold, silver, magnesium, nickel, titanium and zinc are higher than the thermal expansion coefficients of flame-retardant plastic materials, in particular thermoplastic materials.

The linear thermal expansion coefficient of a material is defined as the material's fractional change in length divided by the change of temperature. The coefficient of linear thermal expansion can be designated by the symbol $\alpha$.

In the elongated busbar board 1 according to the present invention, the thermal expansion difference caused by the different thermal expansion coefficients of the electrically insulating material, i.e. the plastic material of the busbar board segments 1-$i$, and of the electrically conductive material, i.e. the metal of the power busbars 6, is compensated. In a possible embodiment, the power busbars 6 are made of copper. In an alternative embodiment, the power busbars 6 can also be made of an alternative electrically conductive material, in particular another metal such as aluminium, steel, brass, gold, silver, etc. or 2 component materials eg copper and aluminium. During operation of a control cabinet the installed devices 11 may generate heat, i.e. dissipation heat. Other specific devices 11 such as cooling devices or fan device 11 may reduce the operation temperature. Further, the ambient temperature of the control cabinet can vary. Consequently, the operation temperature of the control cabinet and the busbar boards 1 installed therein may change over time.

In a preferred embodiment of the elongated busbar board 1 according to the present invention, at a predefined reference temperature $T_{ref}$, expansion joints 36 of a predefined width are provided between adjacent busbar board segments 1-$i$ of the elongated busbar board 1. Accordingly, with increasing temperature, the different busbar board segments 1-$i$ can expand slightly without filling the expansion joints to the next neighbouring busbar board segment 1-($i$+1). Consequently, even with increasing temperature, the busbar board segments 1-$i$ are not pressed against the adjacent neighbouring busbar board segments. As a consequence, no mechanical stress is generated which can deteriorate the mechanical structure of the elongated busbar board 1. Further, the contact openings 5 of the power busbars 6 and the feedthrough openings 7 of the front-side cover plate segments 2-$i$ of the touch protection cover plate 2 are aligned to each other and are still congruent even when the temperature T is rising.

In a further possible embodiment, the elongated busbar board 1 according to the present invention comprises at the rear side of the power-busbar equidistant positioning contours 37 to place the power busbar 6 in corresponding positioning contours of the touch protection base plate segments 3-$i$ fixed to associated touch protection cover plate segments 2-$i$ to align the feedthrough openings 7 of the touch protection cover plate segments 2-$i$ with the equidistant contact openings 5 of the power busbars 6. Further, in an alternative embodiment of the elongated busbar board 1 according to the first aspect of the present invention, each elongated busbar board 1 comprises at the front side of the power busbar positioning contours to align the feedthrough openings 7 of the touch protection front plate segments 2-$i$ with the equidistant contact openings 5 of the power busbars 6 covered by the touch protection front plate segments 2-$i$.

The thermal compensation elements are mechanical provisions to keep the contact openings 5 of the power busbars 6 and the feedthrough openings 7 sufficiently aligned, i.e. congruent even when the temperature T does vary over time during operation of the devices 11 in the control cabinet. The thermal compensation elements comprise the positioning contours and counter contours as well as the expansion joints.

The contact openings 5 of the power busbars 6 enclosed by the elongated busbar board 1 are spaced apart from each other equidistantly in a predefined spacing grid as e.g. visible in FIGS. 29 to 33. In the illustrated implementation, the contact openings 5 of the power busbars 6 are slots adapted to receive electrical contacts 13A of devices 11 inserted through the feedthrough openings 7. The illustrated contact slots of the power busbars 6 are arranged in a predefined spacing grid equidistantly. The feedthrough openings 7 of the touch protection cover plate segments 2-$i$ are spaced apart from each other in the same predefined spacing grid as the contact openings 5 of the underlying power busbars 6. The positioning contours provide an alignment of the feedthrough openings 7 with the contact openings 5 such that even when thermal expansion difference occurs, the electrical contacts 13A of the devices 11 can still be inserted through feedthrough openings 7 into underlying contact openings 5 without effort. Consequently, the positioning contours 37 and the expansion joints 36 compensate for the thermal expansion difference caused by the different thermal expansion coefficients $\alpha$ of the electrically insulating material and of the electrically conductive material.

FIG. 2 shows an embodiment wherein each power busbar 6-1, 6-2, 6-3 comprises at its rear side equidistant positioning contours 37 adapted to place the power busbars 6 on corresponding positioning contours of the touch protection base plate segments 3-$i$ fixed to the associated touch protection cover plate segments 2-$i$ to align the feedthrough openings 7 of the touch protection cover plate segments 2-$i$ with the equidistant contact openings 5 of the covered power busbars 6-1, 6-2, 6-3. In an alternative embodiment, the power busbars 6 can also comprise at its front side positioning contours to align the feedthrough openings 7 of the touch protection front plate segments 2-$i$ with the equidistant contact openings 5 of the power busbars 6 covered by the touch protection front plate segments 2-$i$. In both embodiments, the contact openings 5 of the power busbars 6 are spaced apart from each other equidistantly in a predefined spacing grid as also visible in FIG. 2. The feedthrough openings 7 of the touch protection cover plate segments 2-$i$ are spaced apart from each other in the same predefined spacing grid as the contact openings 5 of the power busbars 6 as also shown in FIG. 2.

In the embodiment of FIG. 2, the equidistant positioning contours 37 provided at the rear side of the power busbars 6 has the form of a notch which can be used to receive a corresponding protruding positioning element of the touch protection base plate segment 3-$i$ having a corresponding shape. The form of the rear side equidistant positioning contours 37 which are used to place the power busbars 6 on the corresponding positioning contours of the touch protection base plate segments 3-$i$ can vary depending on the use case. Also, the distance between the equidistant positioning contours 37 and their corresponding protruding positioning contours can vary depending on the use case and in particular depending on the thermal expansion coefficients of the electrically conductive metal and of the insulating material. A further influencing factor for the positioning contours 37 is the lateral extension of the contact openings 5 as well as the lateral extension of the feedthrough openings 7. If the feedthrough openings 7 and the corresponding equidistant contact openings 5 are very slim, i.e. if the width of the slot is narrow, more compensation of the thermal expansion difference is required leading to busbar board segments 1-$i$ having a reduced length. Accordingly, in this embodiment, the number of the busbar board segments 1-$i$ within the elongated busbar board 1 is increased to take into account the thermal expansion sensitive slim equidistant contact openings 5 and/or slim feedthrough openings 7. The shape of the feedthrough openings 7 and the equidistant contact openings 5 of the power busbars 6 depend in turn on the form of the electrical contacts 13A of the devices 11 to be connected to the elongated busbar board 1. Consequently, the number of adjacent busbar board segments 1-$i$ assembled as modules to form the elongated busbar board 1 and the number of expansion joints 36 and their width as well as the form and distance of the positioning contours 37 depend on the use case and expected temperature variations. With increasing temperature variation, more and broader joints 36 are required to increase the number of busbar board segments 1-$i$ of an assembled elongated busbar board 1. The same is true for the difference of the temperature expansion coefficients. With increasing difference of the temperature expansion coefficients of the insulating plastic material and of the electrically conductive metal material, the number of expansion joints 36 and their widths at the reference temperature $T_{ref}$ is increased.

The thermal expansion difference caused by the changing operation temperature and the different thermal expansion characteristics of the electrically insulating material and the electric conductive material is compensated by mechanical compensation elements including the positioning contour 37 and the corresponding counter contours and the expansion joints 36.

By using the elongated busbar board 1 as illustrated in FIG. 1, it is possible to place various electrical devices 11, in particular switching devices, on the front side touch protection cover plate 2 with plug-in contacts inserted into the contact openings 5 of the encapsulated power busbars 6 via the feedthrough openings 7 for connecting the devices 11 to the power busbar system. FIG. 19 illustrates the connection of an electrical device 11 to an elongated busbar board 1 mounted on a mounting plate 16.

The power busbars 6 encapsulated by the elongated busbar board 1 comprise a plurality of uniformly spaced contact openings 5 of a contact opening array. Electrical connection contacts 13A and their protection ribs 13B protruding from a housing 12 of the electrical device 11 can be inserted through the feedthrough openings 7 into the contact openings 5 lying directly beneath the feedthrough openings 7 to establish an electrical contact and mechanical support. The protruding connection contacts 13A of the electrical device 11 can be surrounded on both sides by contact protection ribs 13B which may protect the connection contacts 13A from mechanical damage. The devices 11 to be connected to the power supply system can comprise for example motor-protective circuit breakers, power circuit breakers, fuse holders, fuse switches, electronic devices or any other switching device of a power distribution system or adapter. The electrical devices 11 can be plugged directly to the front side onto the elongated busbar board 1 without the need of any kind of adapter devices or the necessity to use a tool.

In the embodiment illustrated in FIG. 1, the elongated busbar board 1 is configured for three parallel power busbars 6 of a busbar system. Accordingly, in the illustrated embodiment, the front side touch protection cover plate 2 of the elongated busbar board 1 comprises three rows 4-1, 4-2, 4-3 of feedthrough openings 7. The connecting contacts 13 of the electrical devices 11 are adapted in such a way that they may be passed through the feedthrough openings 7 of the front side touch protection cover plate 2 and, after passing through, may be inserted into correspondingly arranged contact openings 5 of the predetermined matching contact opening array of the electrically conductive power busbars 6 enclosed by the insulating busbar board 1. In the illustrated embodiment of FIG. 1, the contact openings 5 lying directly beneath the feedthrough openings 7 are slot-shaped. Alternatively, the contact openings 5 and the feedthrough openings 7 can also be circular, elliptical, square or triangular. In the illustrated embodiment of FIG. 1, the front side touch protection plate 2 of the elongated busbar board 1 comprises two rows 8-1, 8-2 of contours or slots which are provided for receiving interlocks of installed devices 11 provided for the mechanical connection to the busbar board 1. The interlocks can secure the devices 11 against being pulled unintentionally forward.

In a further possible embodiment, a row 9 of contours or slots can also be provided into which reverse polarity protection ribs of the connected devices 11 may engage. The contours or slots of row 9 within the front side touch protection cover plate 2 of the elongated busbar board 1 can prevent electrical devices 11 from being plugged onto the busbar board 1 with incorrect polarity or incorrect orientation. Due to the arrangement of the various feedthrough slots 7, the locking contours and reverse polarity protection contours or the reverse polarity protection ribs of the devices 11, the entire elongated busbar board 1 can be equipped conveniently and fast with electrical devices 11 without wasting any mounting space.

In the illustrated embodiment of FIGS. 1, 2, the elongated busbar board 1 is provided for receiving three power busbars 6 which can be provided for different current phases L1, L2, L3. The number of power busbars 6 encapsulated by the elongated busbar board 1 may vary for different use cases. For each power busbar 6 enclosed by the elongated busbar board 1, a corresponding power feed-in plug 10 can be provided which can be plugged in a corresponding socket 26 of the touch protection base plate 3 of the elongated busbar board 1 as shown in FIG. 14.

Figure 12:
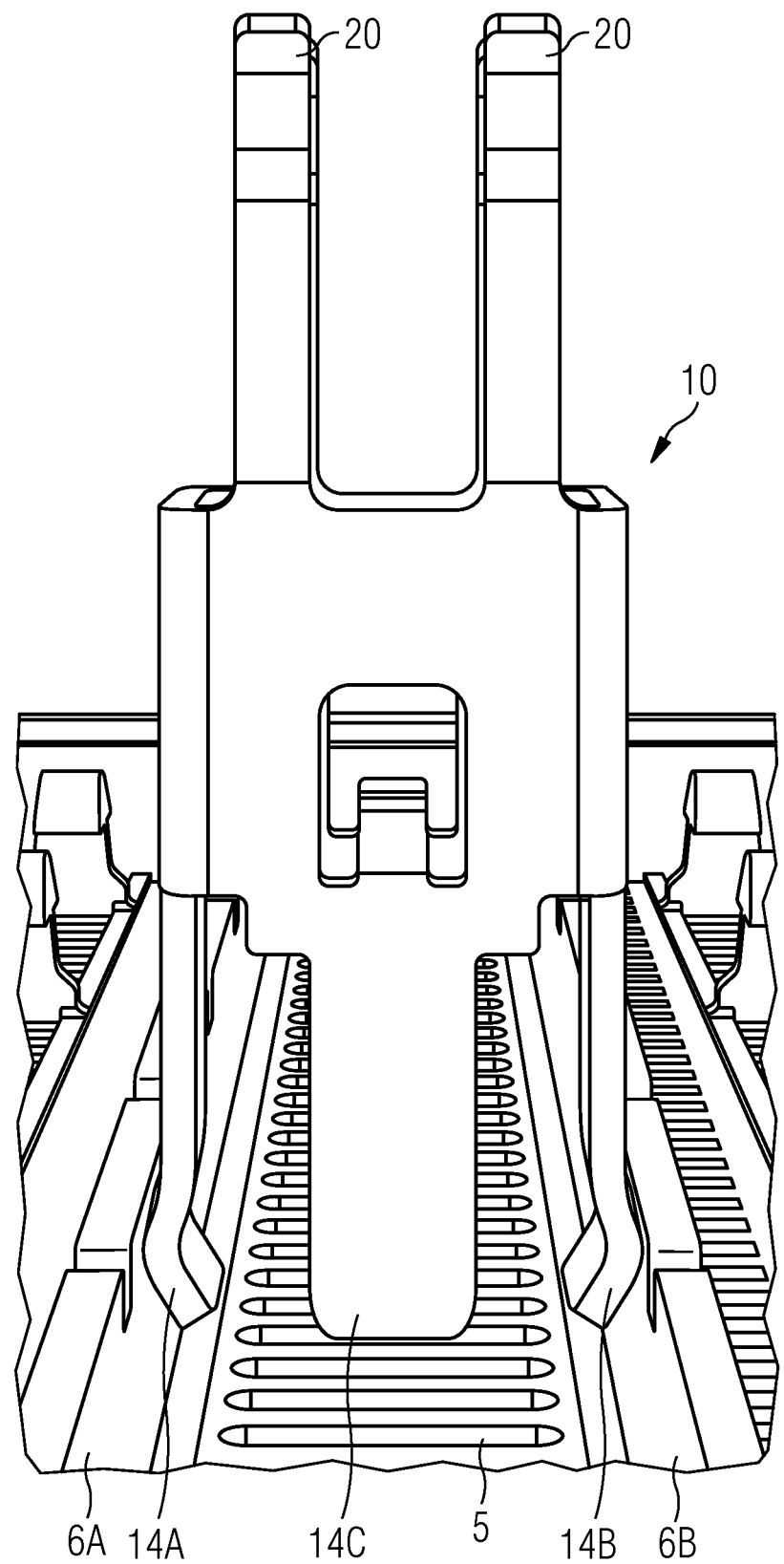
FIG. 12 shows a detailed view on a power feed-in plug used to feed-in electrical power into a power busbar encapsulated by the elongated busbar board according to the present invention.

The power feed-in plugs 10 comprise in a preferred embodiment contact tongues 14A, 14B as illustrated for example in FIGS. 12, 13. The contact tongues 14A, 14B face each other and can abut one or both sidewalls 6A, 6B of the corresponding power busbar 6 from the inside as shown in FIGS. 12, 13. In an alternative embodiment, the contact tongues 14A, 14B of the power feed-in plugs 10 can also abut one or both sidewalls 6A, 6B of the corresponding power busbar 6 from the outside. In a still alternative implementation, the contact tongues 14A, 14B can also be lyra-shaped to embrace one or both sidewalls of a corresponding power busbar 6 to establish an electrical contact.

Lyra-shaped contact tongues 14A, 14B may also embrace a power busbar 6 having a rectangular cross section. The power busbars 6 may also have a different cross-section shape, e.g. L-shape.

In a possible embodiment, the power feed-in plugs 10 provided for the feed-in of electrical power into the different power busbars 6 enclosed by the elongated busbar board 1 can also be integrated in a single multipole feed-in plug module. The front side touch protection cover plate 2 of the elongated busbar board 1 as illustrated in FIG. 1 can be covered completely with devices 11 having electrical connection contacts 13A passing through the feedthrough openings 7 of the touch protection cover plate 2 and being received by contact openings 5 of a contact opening grid of the power busbar 6 to establish an electrical connection between the device 11 and the busbar system.

A rear side power feed-in for the power busbars 6 enclosed by the elongated busbar board 1 by means of the rear side feed-in plugs 10 can be performed in a possible embodiment by means of load break switches and/or current protection elements located at the rear side of the elongated busbar board 1. These load break switches or current protection elements can be either operated from the front side or can be controlled by means of a specific control device 11 connected to the front side of the elongated busbar board 1. The current protection elements can comprise controllable electronic current protection elements or current protection fuses. The current protection element can comprise an apparatus for electronic protection of a device or load connected to the power busbar system. In a possible implementation, the current protection element can comprise a power switch from which the connected load or device 11 receives an electrical current from the power busbar system. The protection element can further comprise a sensor component connected in series with the power switch and adapted to generate directly an electrical voltage drop corresponding to a current rise speed of the electrical current I flowing via the sensor component of the current protection element and via the power switch of the current protection element to the load of the electrical device 11. The current protection element can further comprise a driver circuit adapted to detect an occurring overcurrent depending on the voltage drop generated by the sensor component and to switch off the power switch automatically upon detection of an overcurrent within a short switch-off period of e.g. less than 5 microseconds to protect the power switch and the load of the electrical device 11. The voltage drop generated by the sensor component and the voltage drop along the power switch can be applied as a sum voltage to the driver circuit of the current protection element. The sensor component of the current protection element can comprise a coil which is adapted to generate an induction voltage depending on the electrical current I flowing through the sensor component and through the power switch to the connected load of the electrical device 11.

The touch-protected elongated busbar board 1 as illustrated in FIG. 1 comprises several parallel power busbars 6. Besides the power busbar 6, there can also be integrated electrical data lines providing communication between the connected devices 11. In an alternative embodiment, the devices 11 connected to the power busbar system may communicate directly with each other via the power busbar 6 by means of powerline communication PLC. In a still further possible alternative embodiment, the devices 11 connected to the busbar system may communicate with each other via wireless radio interfaces. The feed-in plugs 10, the feed-in plug module or the touch-protected elongated busbar board 1 may comprise in a possible implementation measuring modules provided for performing a current and/or voltage measurement to generate measurement values output by means of data interfaces to a data processing unit connected to the busbar board 1. In a further possible embodiment, the touch-protected elongated busbar board 1 can also comprise electrical supply lines or supply busbars for supplying measuring modules or transceivers provided within the touch-protected elongated busbar board and/or connected devices 11 with auxiliary supply voltages which are also feed-in from the rear side or front side by means of the feed-in plugs 10. The auxiliary supply voltage can also be generated by transforming the received power supply voltages.

Also data lines integrated in the busbar board 1 can in a possible embodiment be contacted from the rear side by means of corresponding plugs. These plugs can be integrated in a plug module.

The touch-protected elongated busbar board 1 shown in FIG. 1 can also comprise mechanical connection elements used for connecting the elongated busbar board 1 with other similar busbar boards, i.e. elongated and/or not elongated busbar boards.

In a possible embodiment, the touch-protected elongated busbar board 1 comprises a first power busbar 6 for different current phases L of the busbar power system and additional second busbars for protection bars P, N of the power busbar system. The device 11 connectable to the front side of the elongated busbar board 1 can comprise an electric, electronic or electromechanical device which comprises electrical connecting contacts 13 protruding from the bottom side of a housing of the device 11. The device 11 can further comprise protection ribs and/or latching elements for establishing a mechanical connection with the elongated busbar board 1. In a preferred embodiment, the elongated busbar board 1 is connectable without using a mechanical tool to corresponding counter-contours of a mounting plate 16 or of a mounting frame 15. In a preferred embodiment of the elongated busbar board 1 according to the present invention, the feed-in plugs 10 plugged into sockets 26 at the rear side of the elongated busbar board 1 can be locked mechanically.

The feed-in plugs 10 may be mounted without using a tool. In contrast, the removal of the feed-in plugs 10 can be performed in a preferred embodiment only with a tool (similar to a crossboard or busbar board removal).

Figure 3:
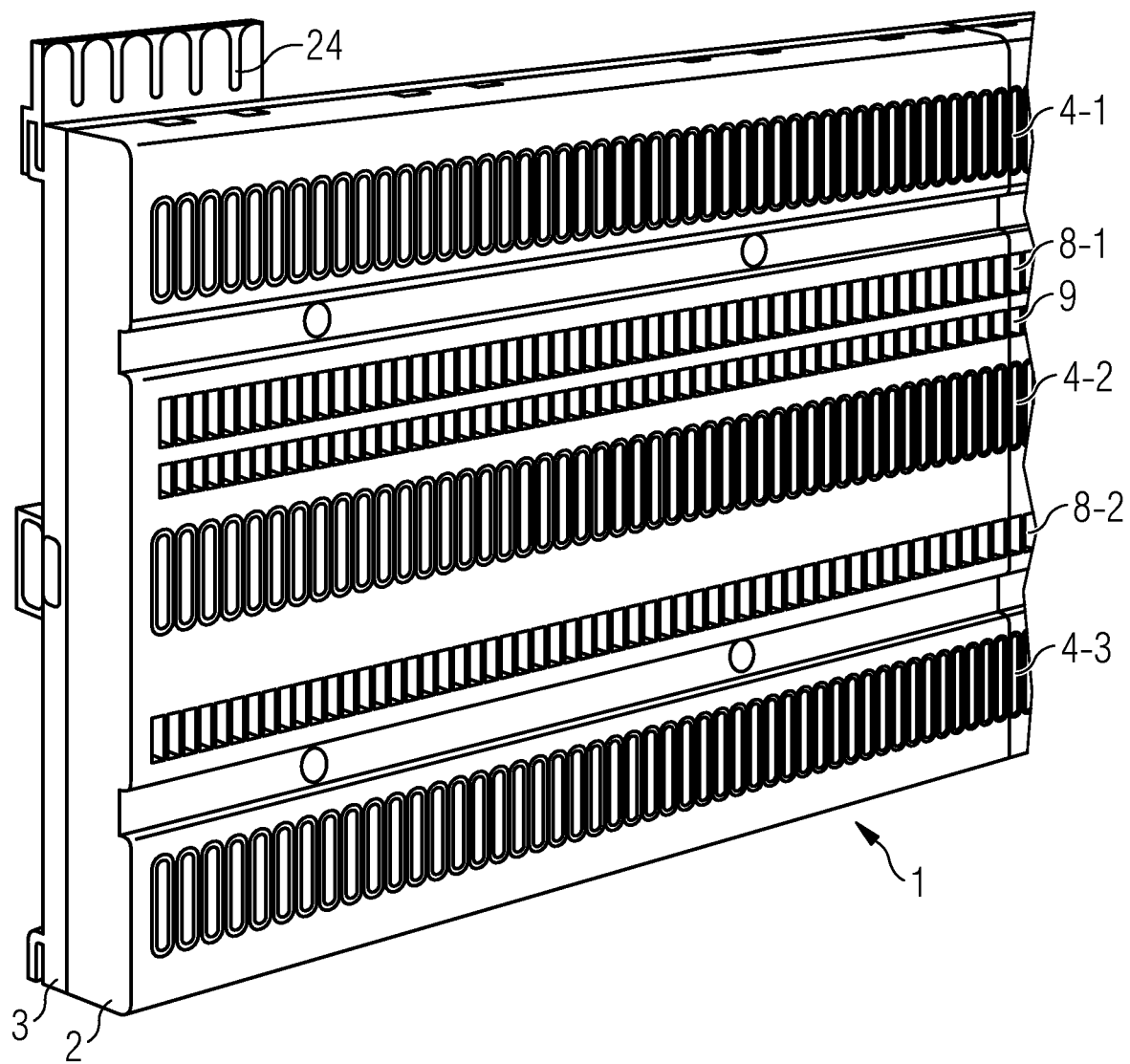
FIG. 3 shows a further detailed view on the elongated busbar board illustrated in FIG. 1.

The elongated busbar board 1 as shown in FIG. 1 comprises in a preferred embodiment an elongated shape wherein further elements can be attached on one or both long sides of the elongated busbar board 1. For example, as shown in FIG. 3, the elongated busbar board 1 can be adapted to receive a system extension element 24 from the upper side of the mounted elongated busbar board 1.

This system extension element 24 can for instance comprise a wiring comb attachable to the upper side of the elongated busbar board 1 used for mounting electrical wires of devices 11.

There can be many different types of extension elements 24 be attached to the busbar board 1. These extension elements 24 comprise for instance additional power busbar modules or adapter elements.

FIG. 4 shows an embodiment where an elongated busbar board 1 according to the present invention is attached to a mounting frame 15. In the illustrated embodiment of FIG. 4, the mounting frame 15 comprises two parallel vertical struts 22A, 22B. The vertical struts 22A, 22B are connected to each other by means of one or more cross-struts 23 as shown in FIG. 4. In the illustrated embodiment of FIG. 4, there are three feed-in power busbars 19 which are attached by means of at least one busbar support element 21 to one of the vertical struts 22 of the mounting frame 15. In a preferred embodiment, the external feed-in power busbars 19 are touch-protected and are oriented in a vertical direction. The number of feed-in power busbars 19 corresponds in a preferred embodiment to the number of internal power busbars 6 enclosed by the elongated busbar board 1. Each power busbar 6 enclosed by the elongated busbar board 1 is connected to an associated external feed-in power busbar 19 by means of an associated power feed-in plug 10. The power feed-in plugs 10 are provided at the rear side of the elongated busbar board 1. The feed-in power busbars 19 are directed perpendicular or crosswise to the power busbars 6 enclosed by the elongated busbar board 1. In a possible embodiment, the power feed-in plugs 10 provided for the feed-in of electrical power into the different power busbars 6 enclosed by the elongated busbar board 1 can comprise each at the rear side lyra-shaped resilient flexible contact tongues 20 as shown in FIG. 9. The contact tongues 20 are facing each other and can abut the associated feed-in power busbar 19 to provide an electrical contact. The elongated busbar board 1 can be attached mechanically to counter-contours of the mounting frame 15 by means of bracket elements, angled elements, adapter elements or other latching elements.

FIG. 5 shows a further view on an embodiment where an elongated busbar board 1 is attached to a mounting frame 15. FIG. 5 shows the rear side of the elongated busbar board 1 connected mechanically to the mounting frame 15. As can be seen in FIG. 5, the feed-in power busbars 19 are attached by means of support elements 21 to a strut 22B of the mounting frame 15. In the embodiment shown in FIG. 5, the elongated busbar board 1 is attached to the mounting frame 15 by means of two busbar support elements 21-1, 21-2. Each busbar support element 21 is adapted to receive the feed-in power busbars 19. In the illustrated embodiment of FIG. 5, the busbar support elements 21 are adapted to receive three feed-in power busbars 19-1, 19-2, 19-3. The feed-in power busbars 19 may comprise in a possible implementation different cross sections. In the illustrated embodiment, the busbar support elements 21 are adapted to receive feed-in power busbars 19 with different variable cross sections and comprise corresponding mechanical adjustment elements.

Figure 7:
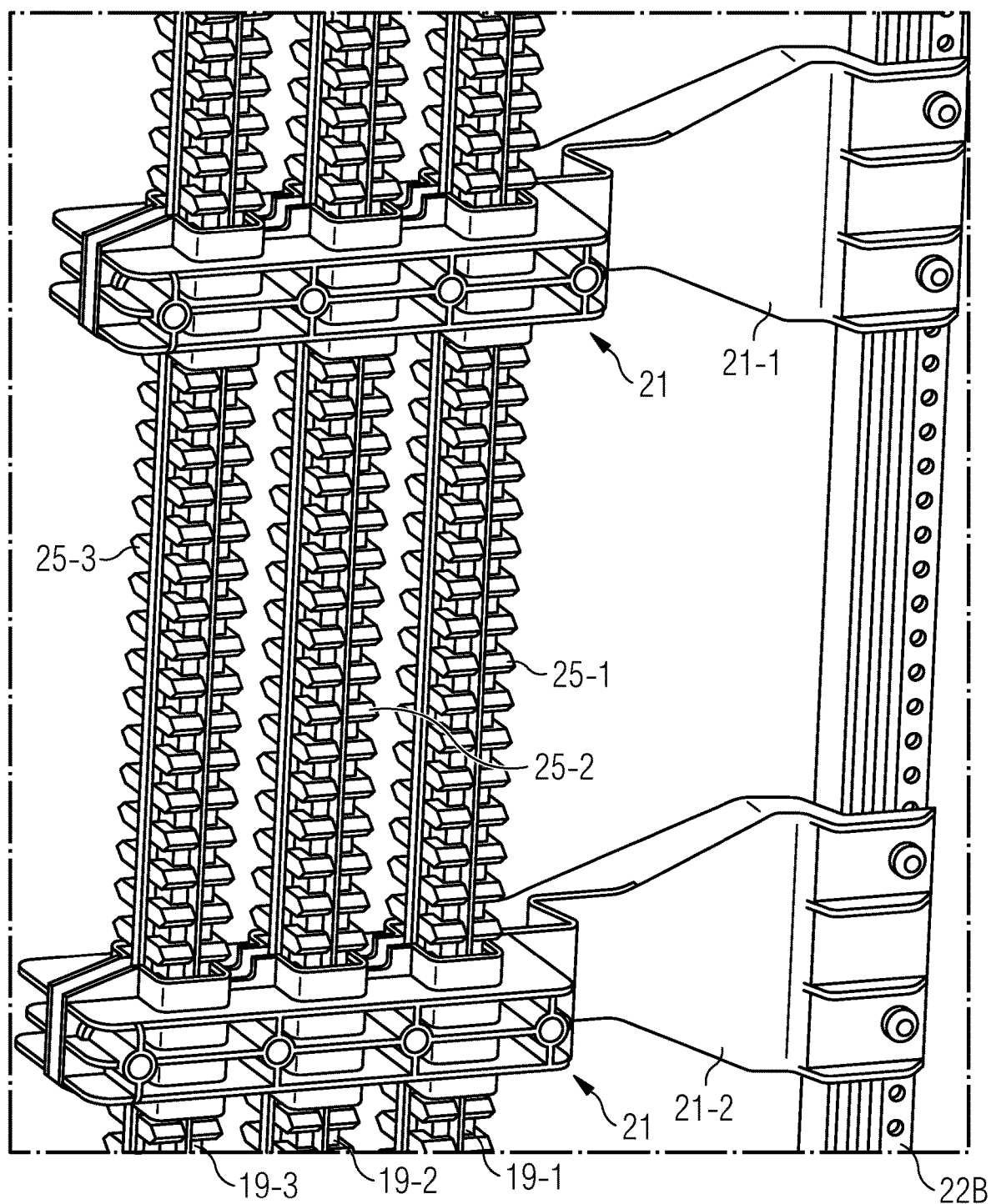
FIG. 7 shows a further view for illustrating an attachment of feed-in power busbars to a mounting frame by means of support elements.
Figure 8:
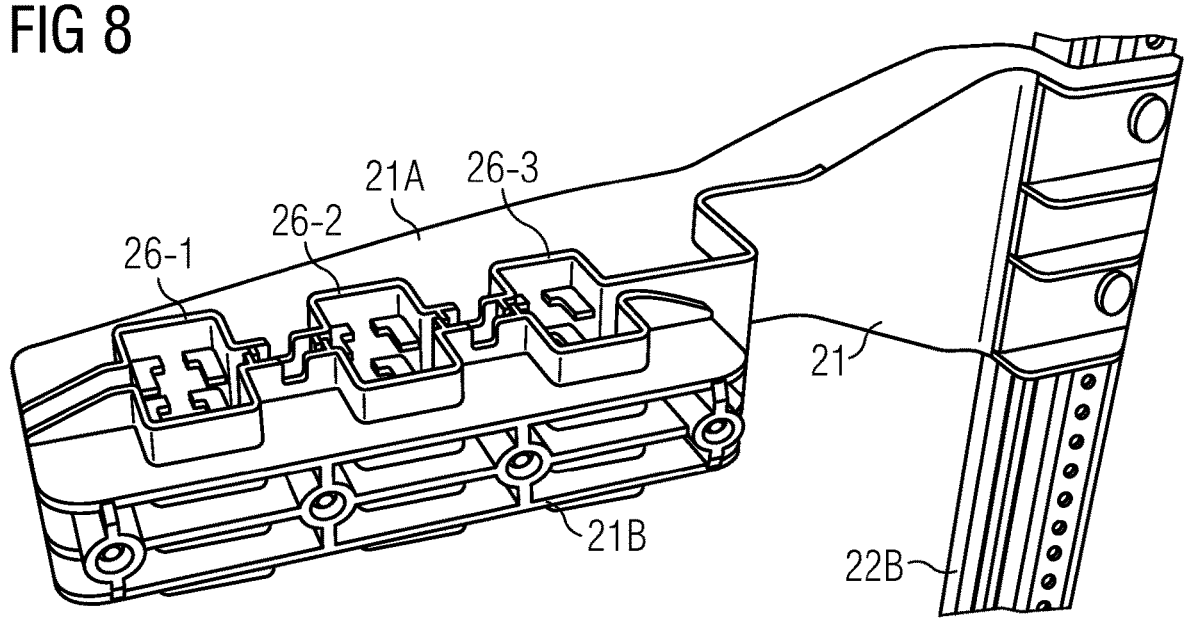
FIG. 8 shows a detailed view on a support element as shown in FIG. 7.

FIGS. 7, 8 show a more detailed view on the support elements 21-1, 21-2 for receiving feed-in power busbars 19.

FIG. 7 shows a view of the mechanical connection of the vertical feed-in power busbars 19 to the parallel vertical strut 22B of the mounting frame 15. In a preferred embodiment, each feed-in power busbar 19 can comprise a touch protection 25 covering the feed-in power busbar 19 at least partially. It is also possible that all feed-in busbars 19 are covered by a common touch protection element. Each external feed-in power busbar 19-1, 19-2, 19-3 is connected at the rear side of the elongated busbar board 1 by means of an associated power feed-in plug 10-1, 10-2, 10-3 to a corresponding integrated power busbar 6-1, 6-2, 6-3.

FIG. 8 shows a busbar support element 21 in more detail. The busbar support element 21 comprises reception contours 26-1, 26-2, 26-3 to receive corresponding feed-in power busbars 19-1, 19-2, 19-3 which can comprise different cross sections. The busbar support element 21 comprises in the illustrated embodiment two parts 21A, 21B which can be mechanically connected by means of screws. The feed-in power busbars 19 are inserted into the receiving contours 26 before the two parts 21A, 21B of the support element 21 are screwed together.

FIG. 9 shows the feed-in power busbars 19-1, 19-2, 19-3 without illustrated touch protection connected electrically by means of contact tongues 20 of power feed-in plugs 10-1, 10-2, 10-3. The power feed-in plugs 10-1, 10-2, 10-3 are provided for the feed-in of electrical power into the encapsulated power busbars 6 enclosed by the elongated busbar board 1. Each feed-in plug 10 can comprise at the rear side flexible contact tongues 20 which are facing each other and which may abut associated feed-in power busbars 19 to establish an electrical connection. The power feed-in plugs 10 can be plugged into corresponding sockets 26 provided at the touch protection base plate 3 of the elongated busbar board 1. The illustrated flexible tongues 20 can be resilient and can be made of a copper material. In an alternative embodiment the contact tongues 20 can be attached to mechanical springs.

Figure 10:
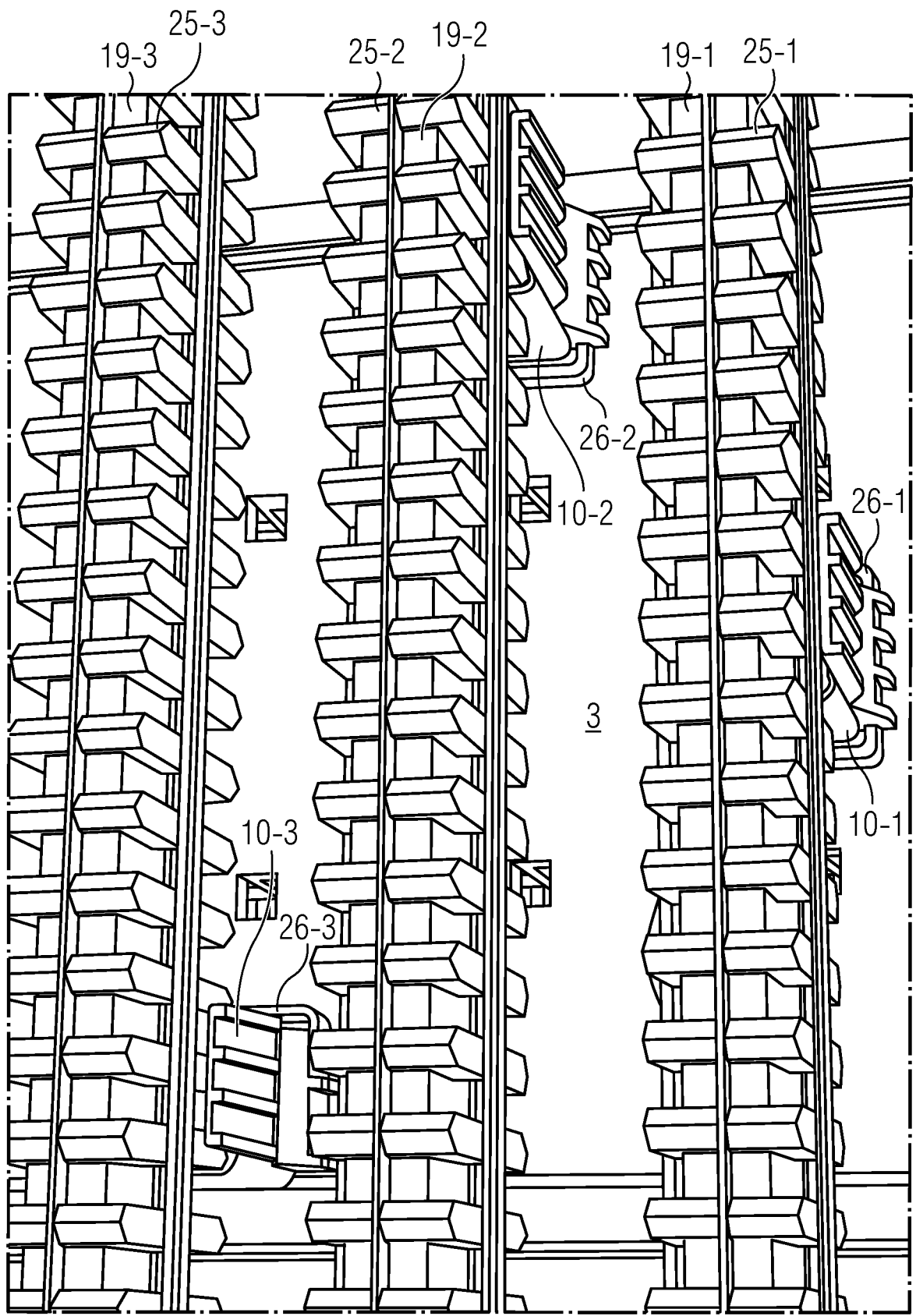
FIG. 10 illustrates an implementation where the external feed-in power busbars are touch-protected.

FIG. 10 shows a similar view as FIG. 9, however, with touch-protected feed-in power busbars 19. FIGS. 9, 10 illustrate the sockets 26 provided at the touch protection base plate 3 for receiving corresponding power feed-in plugs 10-1, 10-2, 10-3 which in turn are electrically connected to the feed-in power busbars 19 by means of electrical contacts 20.

FIG. 11 shows a further view for illustrating the electrical connection between the integrated encapsulated power busbars 6-i and the external feed-in power busbars 19-i. In the illustrated view of FIG. 11, the feed-in power busbar 19-2 and the touch protection base plate 3 are not shown to provide a clearer view on the connection of feed-in power busbar 19-1 with the corresponding integrated power busbar 6-1. The contact tongues 20 of the feed-in plug 10 are pressed against the feed-in power busbar 19 at the rear side of the busbar board 1 and are electrically connected to contact tongues 14A, 14B on the opposite side of the power feed-in plug 10. The feed-in power busbars 19-1, 19-3 are supported by a mechanical support element 21 also visible in FIG. 11.

FIG. 11 shows also contours 8-1, 8-2 having slots provided for receiving latching contours 39 of device latch elements of installed devices 11. These device latch elements are provided to support the device 11 mechanically. The arrow shaped contours 27 shown in FIG. 11 are used to connect both housing halves of the busbar board 1, i.e. the upper housing part formed by the front plate 2 and the rear base plate 3.

FIG. 12 shows the electrical connection by means of a power feed-in plug 10 without its plastic housing in even more detail. In the illustrated embodiment of FIG. 12, the power feed-in plug 10 comprises contact tongues 14A, 14B facing each other and pressed against sidewalls 6A, 6B of a power busbar 6 from the inside. On the opposite side of the contact tongues 14A, 14B, FIG. 12 illustrates resilient flexible contact tongues 20 which are attached to the external feed-in power busbar 19. The contact tongues 20 and the contact tongues 14A, 14B are electrically connected with each other. Electrical power supplied by an external power supply system to the external feed-in power busbars 19 is supplied via the contact tongues 20 integrated in the power feed-in plug 10 to the contact tongues 14A, 14B pressed against the sidewalls 6A, 6B of the power busbars 6 which receive the electrical power via the contact tongues 14A, 14B. In a possible implementation, the feed-in plug 10 may comprise additionally a central element 14C.

Figure 13A:
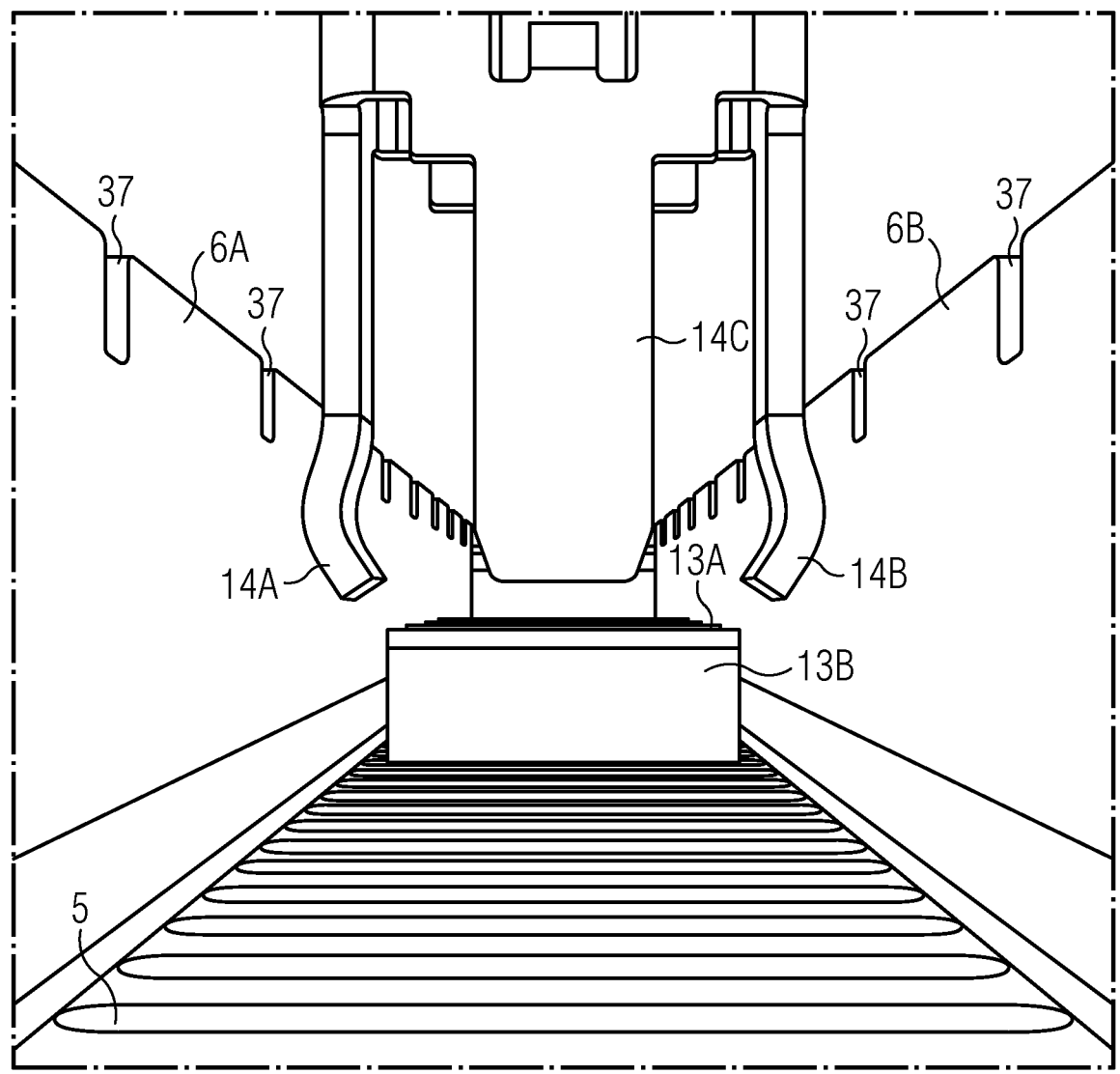
FIGS. 13A, 13B show further detailed views for illustrating the electrical connection between a power feed-in plug and a power busbar encapsulated by an elongated busbar board according to the present invention.
Figure 13B:
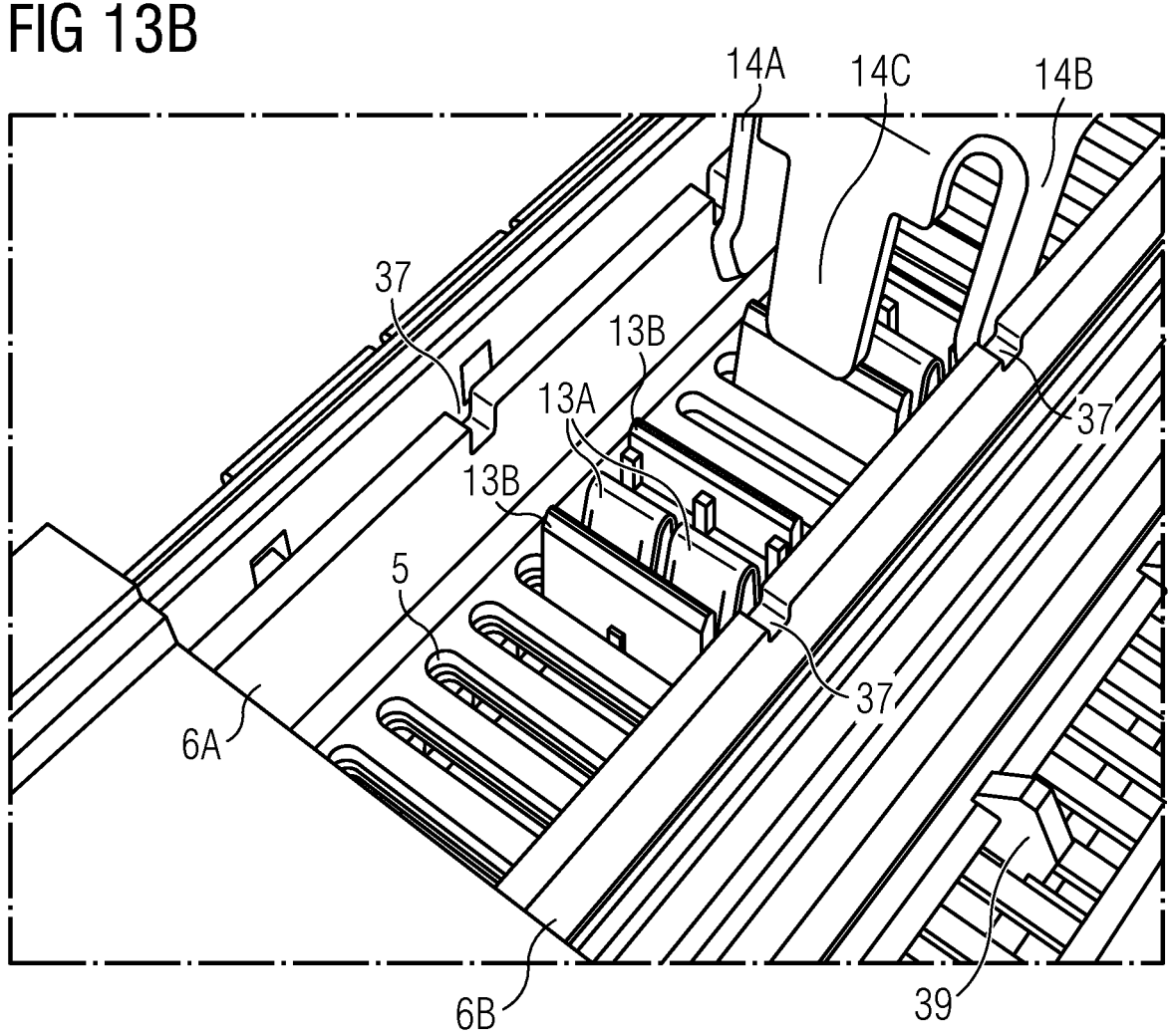

FIGS. 13A, 13B illustrate the electrical connection between the contact tongues 14A, 14B and the sidewalls 6A, 6B of the power busbar 6 in more detail. In FIGS. 13A, 13B, the protruding electrical contacts 13A are inserted along with the protection ribs 13B into the receiving contact openings 5 of power busbar 6 are illustrated.

Figure 15:
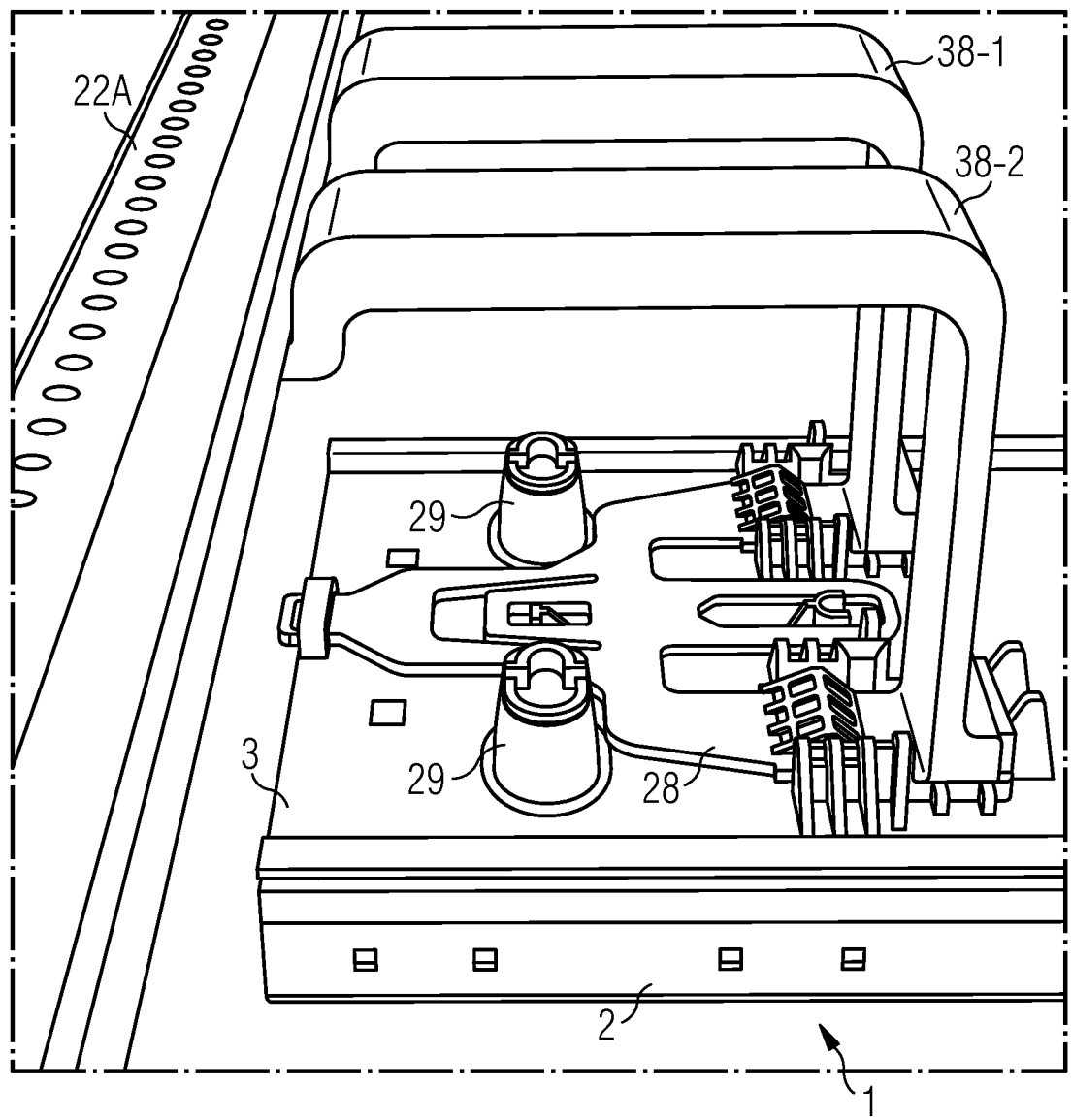
FIG. 15 shows a detailed view for illustrating a mounting of an elongated busbar board to a mounting frame.
Figure 16:
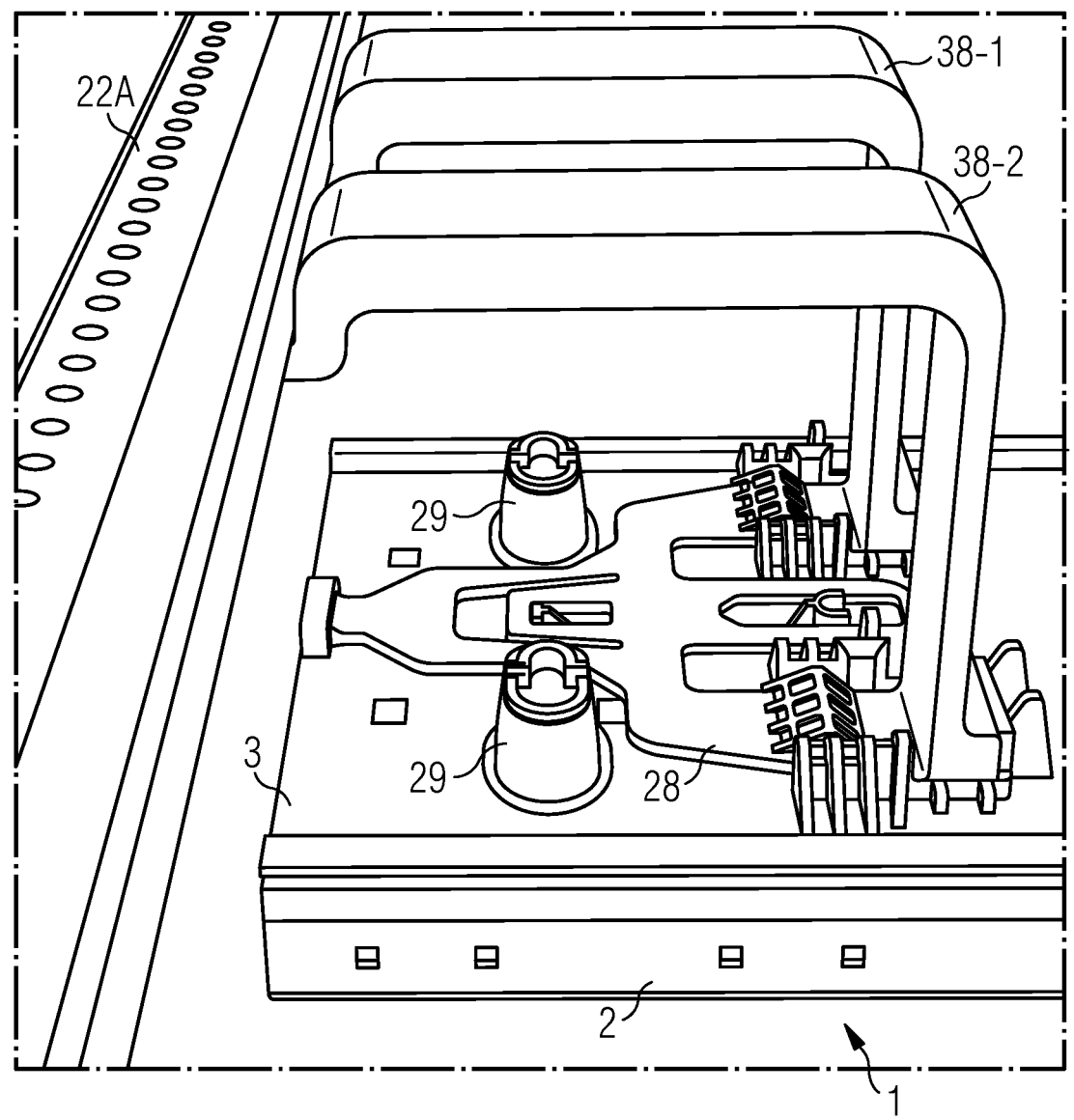
FIG. 16 shows a further view for illustrating the mounting of an elongated busbar board to a mounting frame.

FIG. 14 shows a further rear view on an elongated busbar board 1 connected by means of rear side power feed-in plugs 10 to feed-in power busbars 19. The power feed-in plugs 10 are pluggable into corresponding sockets 26 provided within the touch protection base plate 3 at the rear side of the elongated busbar board 1. FIG. 14 illustrates the resilient flexible contact tongues 20 providing the electrical connection to the feed-in power busbar 19. On the opposite side, the contact tongues 14A, 14B providing electrical contact to the integrated power busbars 6 encapsulated by the elongated busbar board 1 are also visible. The power feed-in plugs 10-i can also be integrated into a common multi-pole feed-in plug module. In a possible embodiment, the power feed-in plugs 10 can be plugged into the corresponding sockets 26 to establish electrical connection. In a possible implementation, the plugged-in pluggable power feed-in plugs 10 can be mechanically locked before mounting the elongated busbar board 1 to the mounting frame 15 or to the mounting plate 16. The locking can be performed for example by two clipping hooks facing each other and provided at the socket 26, as illustrated in FIG. 14. FIGS. 15, 16 illustrate a mechanical connection of the elongated busbar board 1 to a vertical strut 22A of the mounting frame 15 by means of two bracket elements 38-1, 38-2 and a latching element 28 which can be operated between two positions by a user or operator. FIG. 15 shows the latching element in a first position and FIG. 16 in a second position. The elongated busbar board 1 can be attached by means of the latching mechanism 28 to counter-contours of the holding bracket elements 38-1, 38-2. In a preferred embodiment, the elongated busbar board 1 is mechanically connectable to the mounting frame 15 without using a mechanical tool. Removing or detachment of the elongated busbar board 1 in contrast can require the use of a mechanical tool such as a screwdriver used for shifting the latching element 28 between the two positions illustrated in FIGS. 15, 16. Accordingly, in a preferred embodiment, the elongated busbar board 1 according to the present invention can be detached from the mounting frame 15 or from a mounting plate 16 by using a mechanical tool to operate the mechanical latching element 28 as illustrated in the implementations of FIGS. 15, 16. The mechanical latching element 28 engages the mounting brackets 38-1, 38-2 and can be shifted along the elongated busbar board 1.

Figure 18:
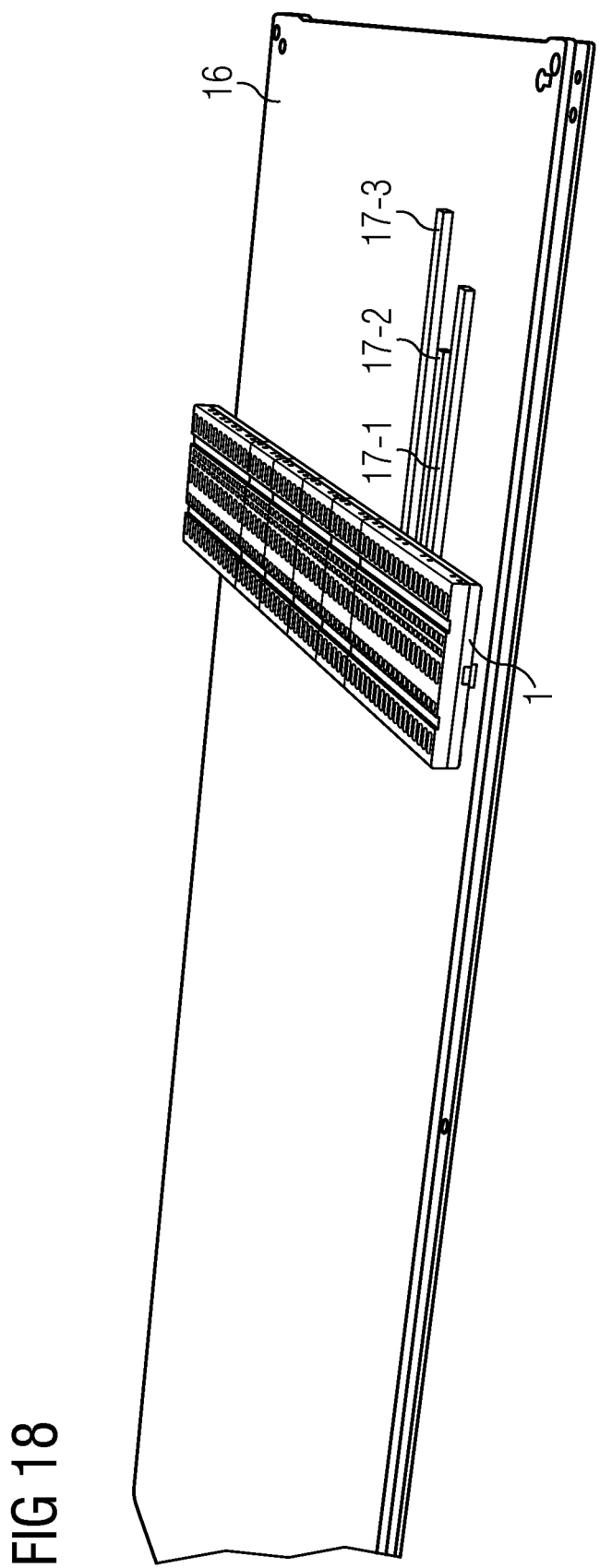
FIG. 18 shows a further view where an elongated busbar board according to the present invention is mounted to a mounting plate.

FIGS. 17, 18 illustrate an embodiment where the elongated busbar board 1 is attached to a mounting plate 16. The busbar board 1 (which may also referred to as crossboard) can be screwed to the mounting plate 16 or can be clipped onto corresponding counter contours of the mounting plate 16 without using a tool (similar to clipping on a mounting frame 15). In a possible embodiment, feed-in laminated copper busbars 17 can be provided on the surface of the mounting plate 16 for providing electrical feed-in of electrical power into the power busbars 6 integrated in the elongated busbar board 1.

Similar to the mounting frame system a feed-in busbar system can be implemented in an alternative embodiment. The feed-in busbar of such a feed-in busbar system can be provided at a distance apart from the mounting plate 16 or being galvanically isolated by means of an insulating plate.

Figure 20:
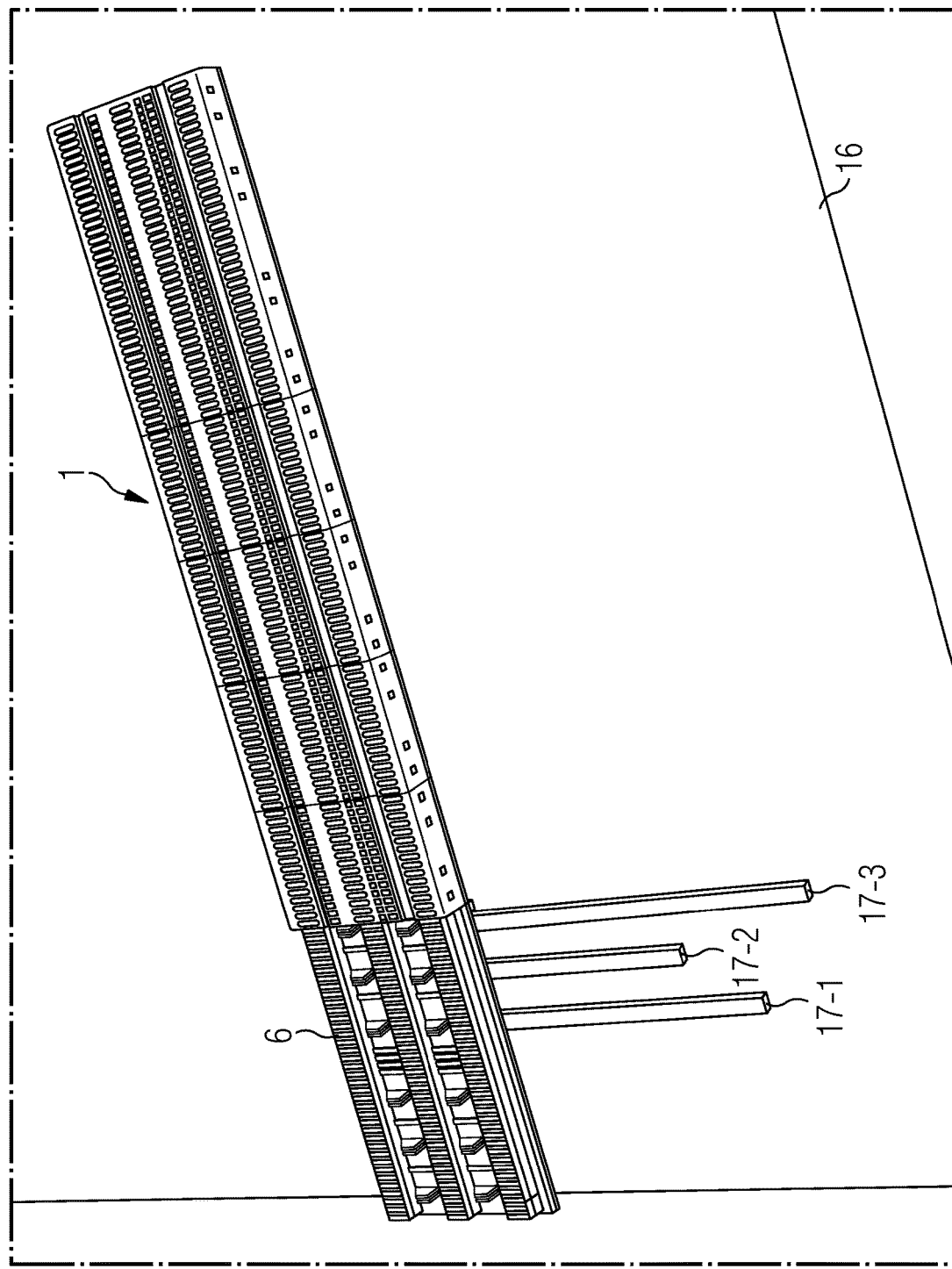
FIG. 20 shows a further view for illustrating an elongated busbar board according to the present invention mounted to a mounting plate.

FIG. 19 shows a further view where an electrical device 11 is attached to the front side of the elongated busbar board 1 and is supplied with electrical power via the feed-in power laminated copper busbar 17 extending between the touch protection base plate 3 and the front surface of the mounting plate 16. As can be seen in FIG. 19, the touch protection base plate 3 can comprise several domes 29 providing a spacing between the rear side of the elongated busbar board 1 and the front side of the mounting plate 16. Connection screws can be used for attaching the elongated busbar board 1 mechanically via the domes 29 to the mounting plate 16. For each integrated power busbar 6 encapsulated by the elongated busbar board 1, a corresponding power supply feed-in laminated copper busbar 17 can be provided. In the example illustrated in FIGS. 18, 19, the system comprises three feed-in lamellae 17-1, 17-2, 17-3 providing a power supply for a corresponding number of power busbars 6-1, 6-2, 6-3 integrated in the elongated busbar board 1 as also illustrated in FIG. 20.

Figure 21:
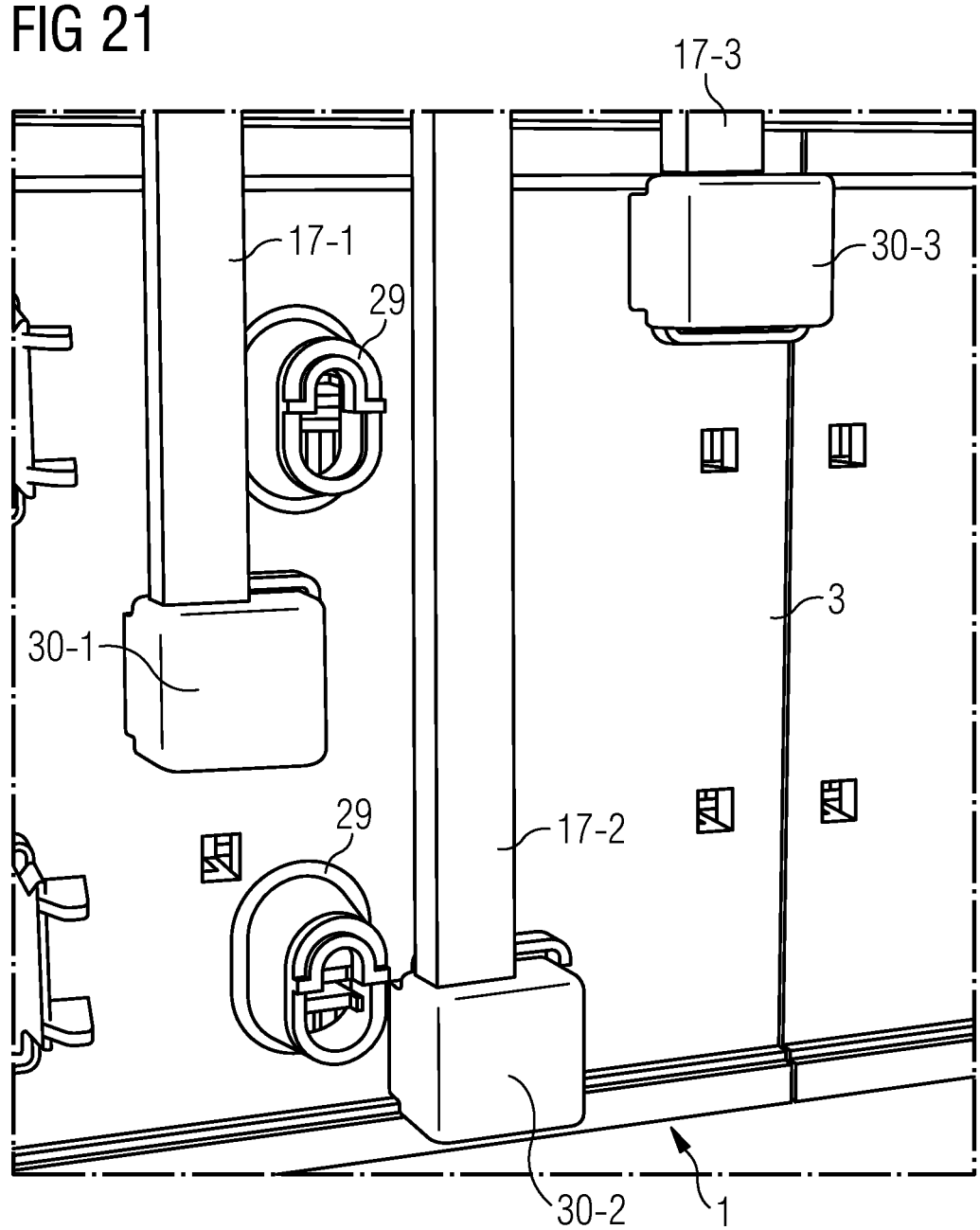
FIG. 21 shows a detailed view for illustrating the feed-in of electrical power at the rear side of an elongated busbar board by means of feed-in lamellae.
Figure 22:
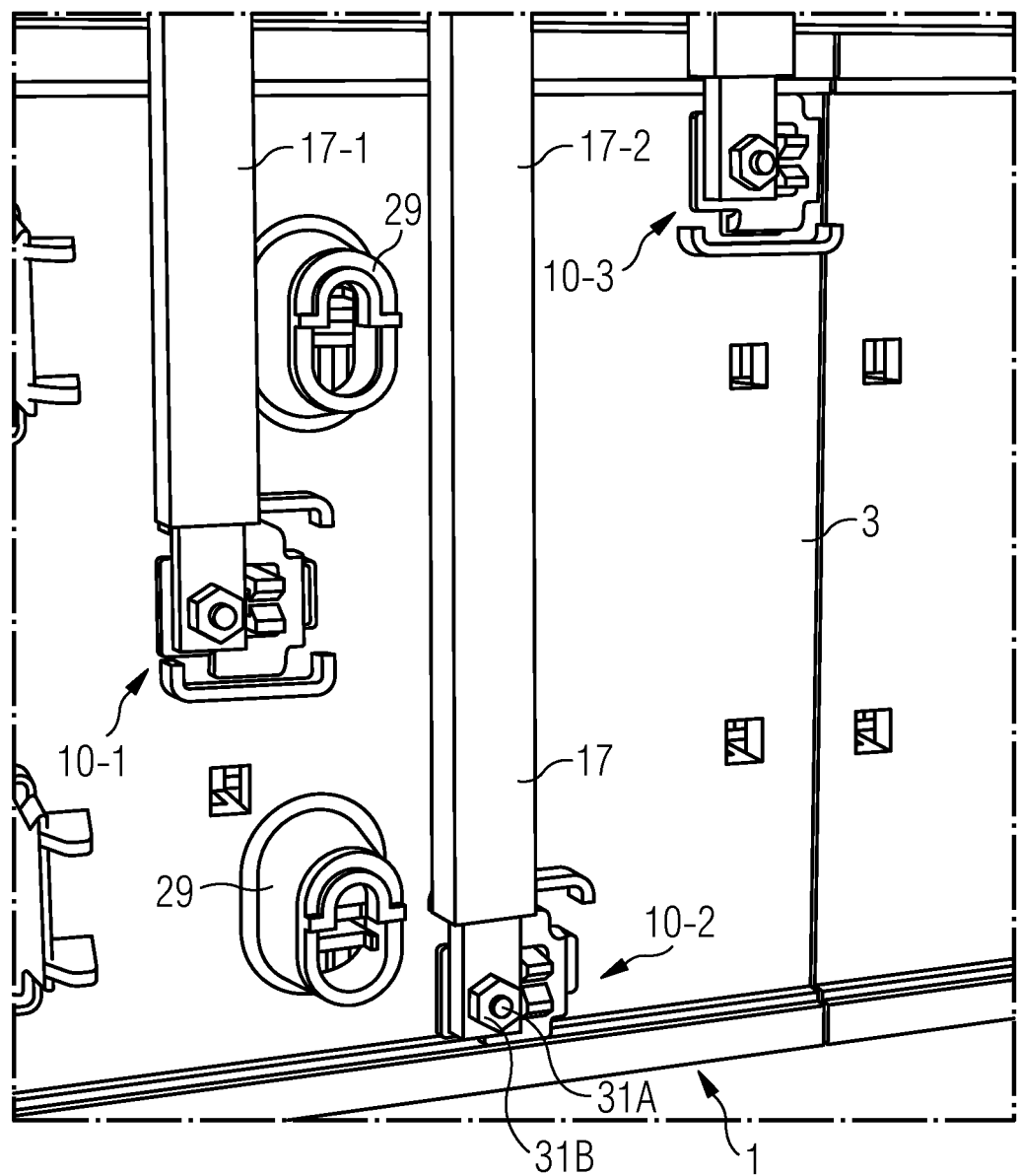
FIG. 22 shows a further detailed view for illustrating electrical contacts used for feeding in electrical power by means of feed-in lamellae at the rear side of an elongated busbar board according to the present invention.
Figure 23:
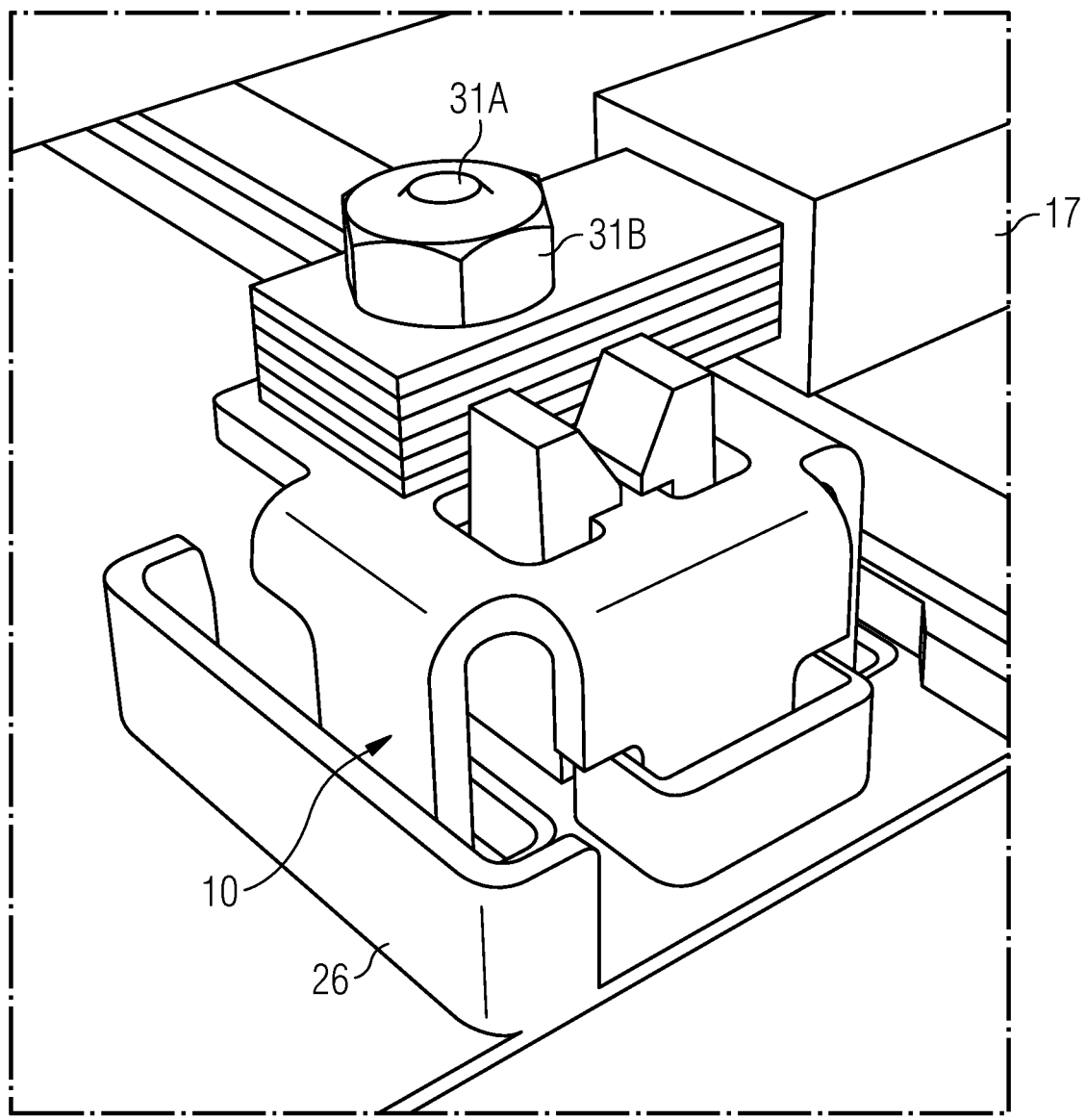
FIG. 23 shows a detailed view of the electrical connection of a feed-in lamella.

FIG. 21 shows the attachment of the feed-in laminated copper busbar 17 to the rear side of the elongated busbar board 1 in more detail. The electrical connection of the feed-in lamella 17 by means of a clamp or a screw connection as shown in FIG. 22 can be covered by cover hoods 30-1, 30-2, 30-3 as shown in FIG. 21. The different electrical connections of the feed-in laminated copper busbar 17-i can in a preferred embodiment also be touch-protected. This can be achieved by means of an electrical isolation layer or an electrical isolating cover. The final section of the feed-in laminated copper busbar 17 can be connected by means of an electrical screw or bolt 31A and by means of mechanical connection nut 31B to a power feed-in plug 10 plugged into a socket 26 of the touch protection base plate 3 as illustrated in more detail also in FIG. 23.

FIGS. 24 to 27 show a feed-in module for all three power busbars 6. It is possible to provide three separate single-pole feed-in modules.

Figure 24:
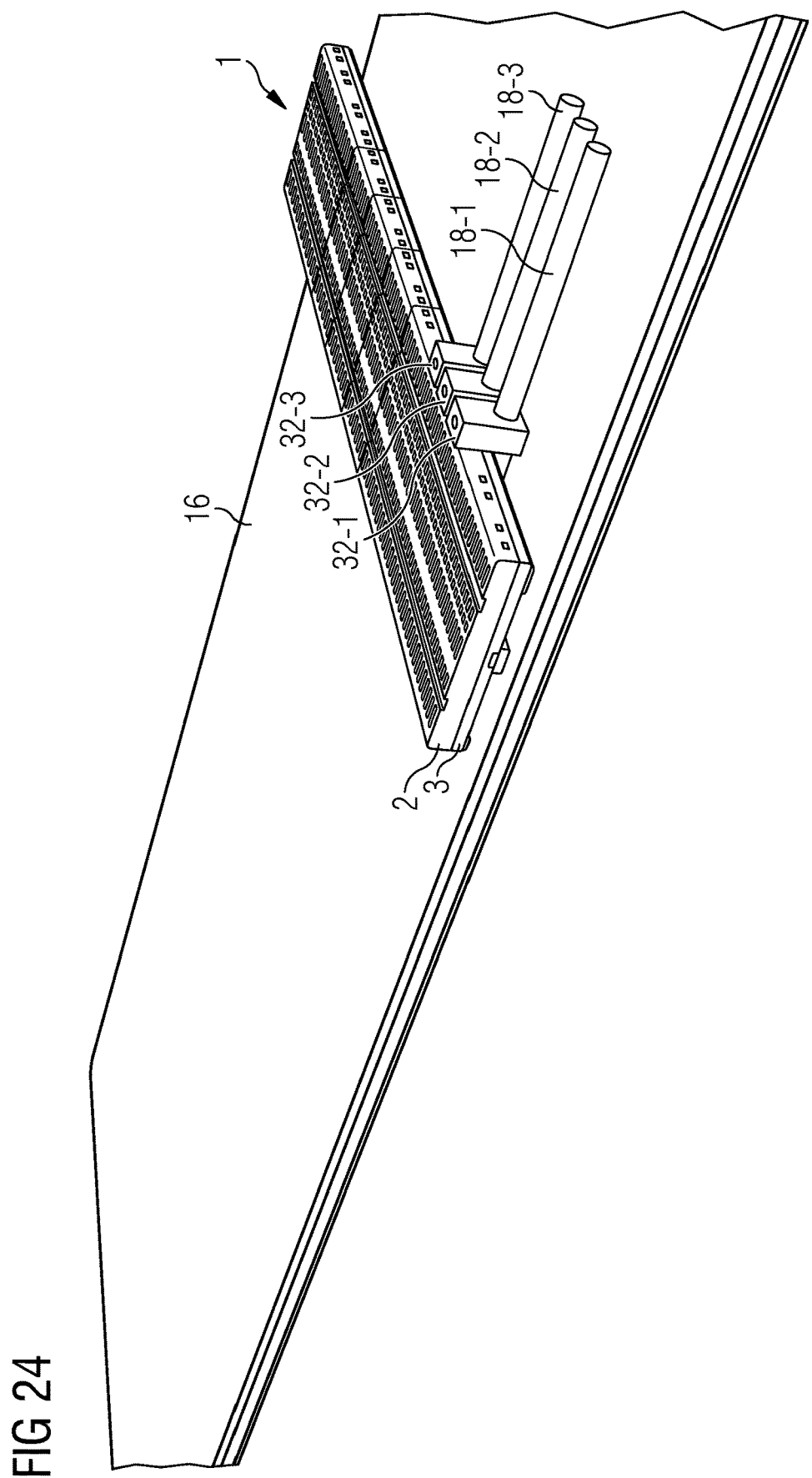
FIG. 24 shows a further embodiment of an elongated busbar board according to the present invention where the feed-in of electrical power is performed by means of feed-in circular conductors.
Figure 25:
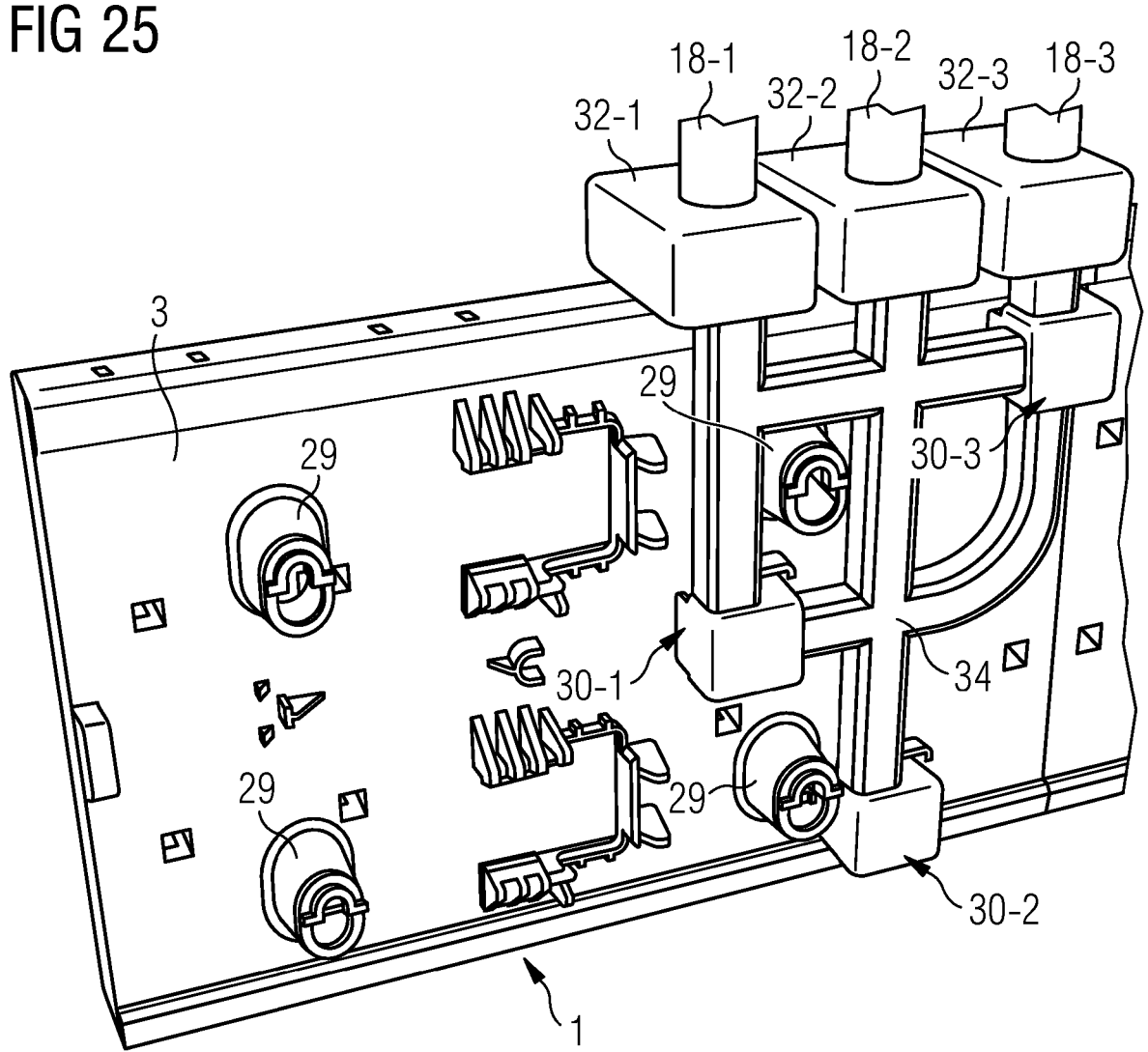
Figure 26:
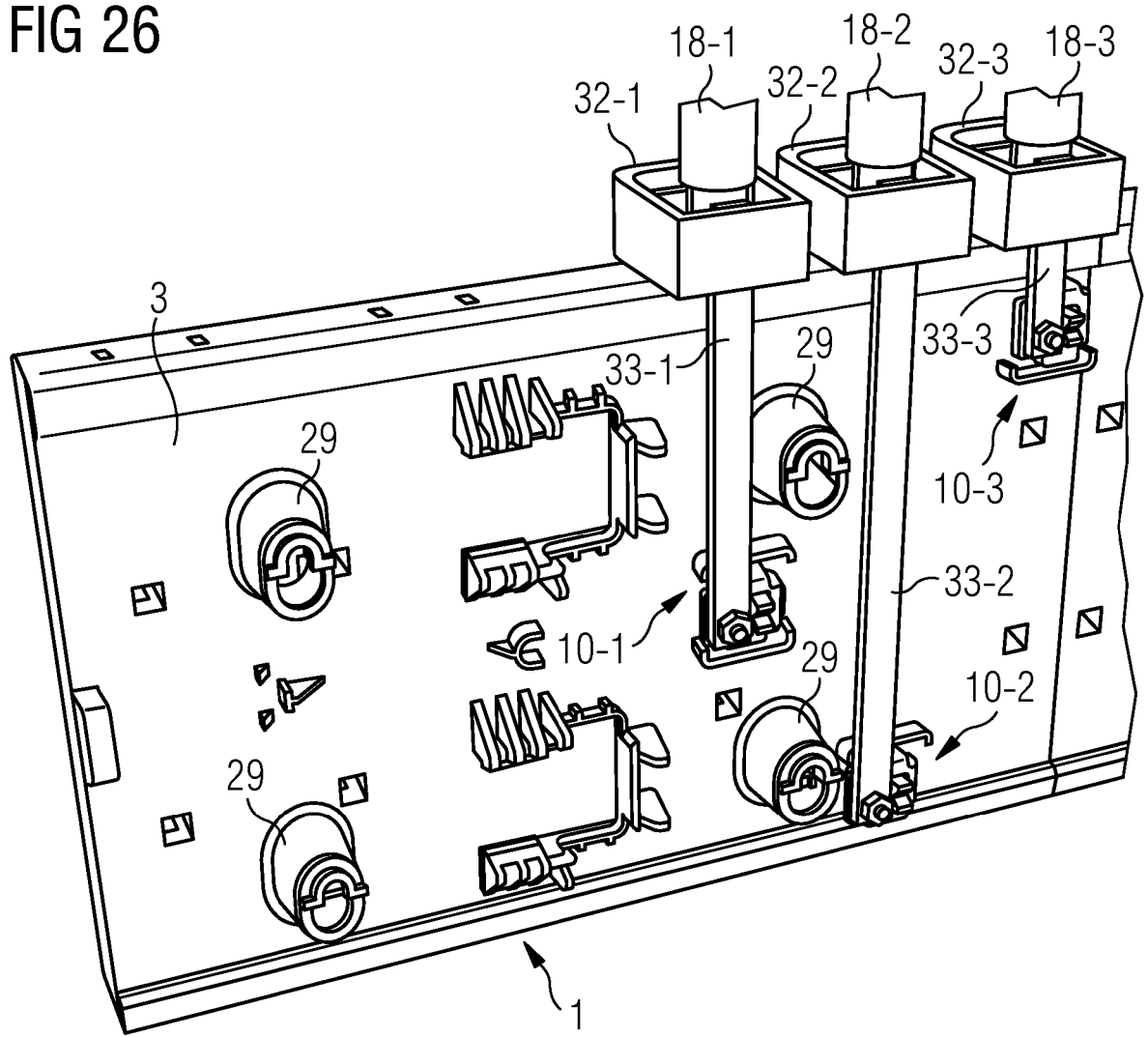
FIG. 26 shows a further detailed view for illustrating a power feed-in using feed-in circular conductors.
Figure 27:
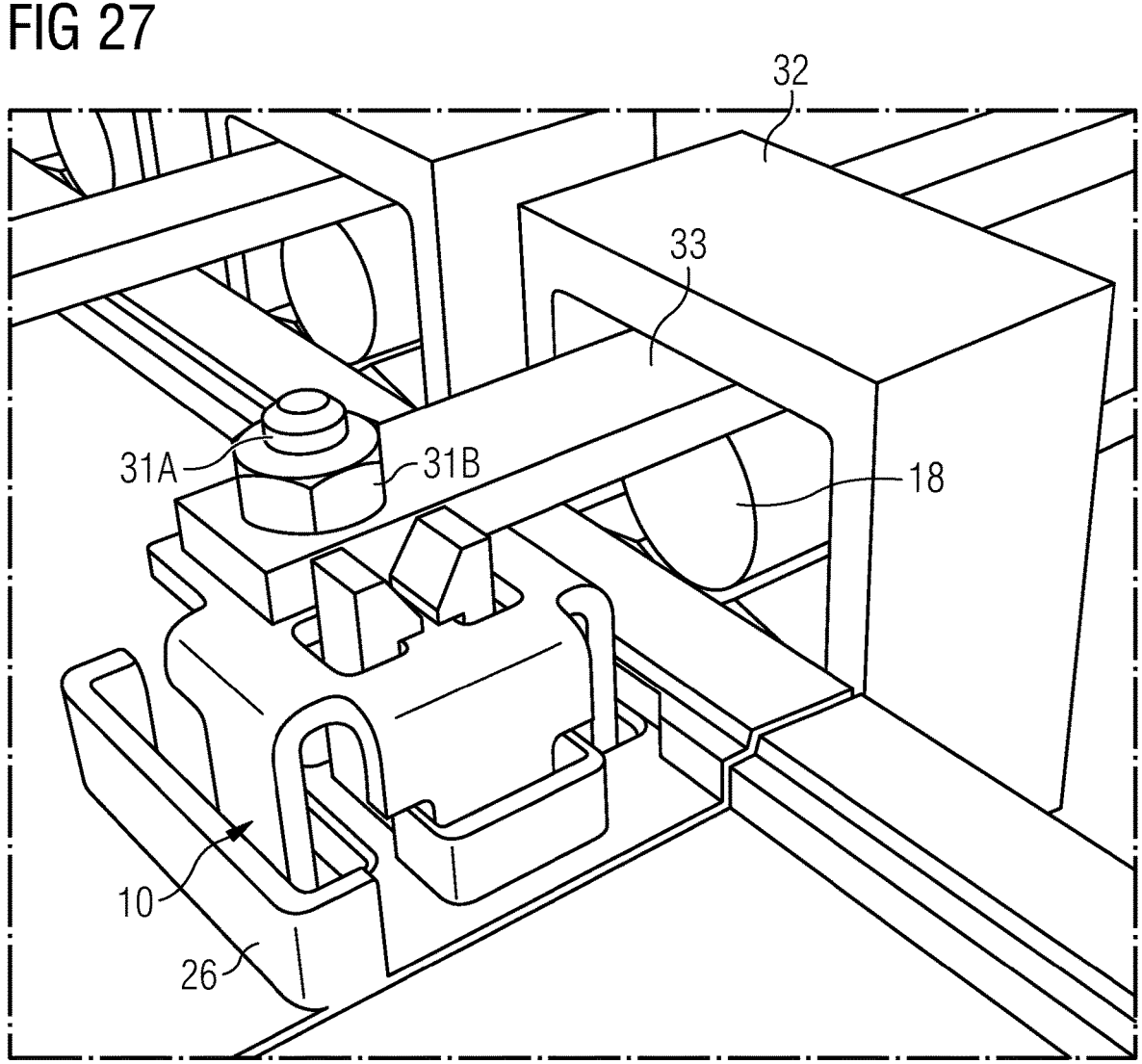
FIG. 27 shows a detailed view for illustrating the feed-in of electrical power using a feed-in circular conductor.

FIG. 24 shows a further variant of a rear side power feed-in of an elongated busbar board 1 according to the present invention. In the illustrated embodiment of FIG. 24, the elongated busbar board 1 is attached to a mounting plate 16 and receives power via feed-in circular conductors 18. Similar to the feed-in lamellae 17, the feed-in circular conductors 18 can be connected at the rear side of the elongated busbar board 1 by means of power feed-in plugs 10 as shown in FIGS. 26, 27. The circular conductors 18-i can be mechanically attached to connectors 32 connected at the rear side via an electrical conduction strip 33 to a power feed-in plug 10 as shown in FIG. 26. The electrical conduction strips 33 can be touch-protected by a cover 34 as also shown in FIG. 25. At the rear side of the feed-in module a further set of clamps for round wires can be attached which can be used to connect lines or wires which may provide power supply for another busbar board 1. In this way, an electrical current may be looped through the feed-in module.

Accordingly, one or more elongated busbar boards 1 can be connected to a mounting plate 16 or to a mounting frame 15. The mounting frame 15 or the mounting plate 16 can be integrated in a control cabinet according to a further aspect of the present invention. The control cabinet can be provided for a plurality of different electrical devices 11 connectable to the integrated elongated busbar boards 1 of the control cabinet. These devices 11 can include electric, electronic or electromechanical devices having electrical contacts to establish an electrical connection to the power busbars 6 encapsulated by the elongated busbar boards 1 of the control cabinet. In a preferred embodiment, the elongated busbar boards 1 are mounted to the mounting frame 15 or to the mounting plate 16 such that the elongated housing of the elongated busbar boards 1 extends in horizontal direction. Consequently, the integrated power busbars 6 are also directed in a horizontal direction and can be supplied with power by vertical power supply busbars 19 as shown in FIG.

4 or by power supply laminated copper busbars 17 as shown in FIG. 18 or by circular power conductors 18 as shown in FIG. 24. Besides the touch-protected integrated power busbars 6, further busbars or other electrical conductors can be integrated in the housing of the elongated busbar board 1. Further, mechanical interfaces can be provided to attach further elements on both sides of the elongated busbar board 1. The touch-protected elongated busbar board 1 can also comprise mechanical connection elements used for connecting the elongated busbar board 1 with other similar busbar boards 1 on all four sides of the busbar board 1. The length, width and depth of the elongated busbar board 1 can vary depending on the use case and the electrical requirements of the electrical devices 11 connected to the busbar system.

The touch protection cover plate 2 of the elongated busbar board 1 can provide in a possible embodiment IP20 protection against accidental contact. In further possible embodiments, the touch protection cover plate 2 can also comprise IP30 or IP40 protection against accidental contact possibly by additional parts or components. This does also apply for the feed-in power busbar system. Polarity reversal protection slots can reliably prevent accidental twisting of the device 11 to be connected to the elongated busbar board 1. The devices 11 can be connected to and disconnected from the busbar system without the use of any tools. If necessary, a slotted screwdriver may be used to operate a latching element such as the latching element 28 to disconnect the elongated busbar board 1 from a mounting plate 16 or from a mounting frame 15.

In a possible embodiment of the elongated busbar board 1, electrical data lines for communication between different devices 11 connected to the power busbars 6 can be integrated in the elongated busbar board 1. In possible embodiments, the devices 11 inserted into the elongated busbar board 1 can comprise a transceiver for exchanging information data by means of powerline communication PLC via the electrically conductive power busbars 6. In a still further alternative embodiment, the devices 11 connected to the elongated busbar board 1 may communicate with each other by means of separate wireless radio interfaces including WLAN, Bluetooth, ZigBee or RFID interfaces. Particular in the case of radio interfaces, the devices 11 may communicate with external transmitters and receivers such as smartphones in order to exchange and set data and parameters.

Further, cooling pipes can be provided within the housing of the elongated busbar board 1 in a possible implementation. The cooling pipes may be provided to transport a dissipating waste heat from the interior of the elongated busbar board 1 and may run vertically after the elongated busbar board 1 has been attached to the mounting frame 15 or mounting plate 16.

Since the power feed-in of electrical power is performed in a preferred embodiment from the rear side of the elongated busbar board 1, the front side of the elongated busbar board 1 can be completely covered by different kinds of electrical devices 11 without wasting any space.

Further variants of the elongated busbar board 1 are possible. The power feed-in-plugs 10 or a power feed-in module can also be first plugged into the external power feed-in system and then be fixed. After this the elongated busbar board 1 is put on the power feed-in plugs 10 or on the power feed-in module.

REFERENCE LIST 1 elongated busbar board
1-*i* busbar board segment
2 front side touch protection cover plate
2-*i* touch protection cover plate segment
3 touch protection base plate
3-*i* touch protection base plate segment
4 rows of feedthrough openings
5 contact openings
6 power busbars
7 feedthrough openings
8 rows for receiving interlocks
9 row
10 feed-in plugs
11 electrical devices
12 device housing
13A electrical contacts
13B protection ribs
14 contact tongues
15 mounting frame
16 mounting plate
17 feed-in laminated copper busbars
18 feed-in circular conductors
19 feed-in power busbars
20 contact tongues
21 busbar support element
22 vertical struts
23 cross-struts
24 system extension element
25 touch protection
26 sockets
27 interlocks
28 mechanical latching element
29 dome
30 cover hood
31A bolt
31B connection nut
32 connector
33 conduction strip
34 cover
35A clip connection
35B clipping hole
36 expansion joint
37 positioning contour
38 holding bracket element
39 device latch element

The invention claimed is:

1. An elongated busbar board for connection of devices to a power busbar system, comprising:
a front side touch protection cover plate including touch protection cover plate segments made of an electrically insulating material and having feedthrough openings for electrical connection contacts of devices to be connected to the elongated busbar board, wherein the touch protection cover plate is adapted to cover one or more power busbars made of an electrically conductive material having contact openings lying directly beneath the feedthrough openings of the touch protection cover plate segments; and
a touch protection base plate connected to said touch protection cover plate and including touch protection base plate segments made of the electrically insulating material and adapted to cover the one or more power busbars enclosed by the elongated busbar board from behind,
wherein a thermal expansion difference caused by different thermal expansion coefficients of the electrically insulating material and of the electrically conductive material is compensated by thermal compensation elements, wherein the thermal compensation elements include positioning contours and corresponding counter contours and expansion joints between adjacent busbar board segments.

2. The elongated busbar board according to claim 1 wherein the one or more power busbars are made of an electrically conductive metal having a thermal expansion coefficient being lower than the thermal expansion coefficient of the electrically insulating material of the touch protection cover plate segments and of the touch protection base plate segments.

3. The elongated busbar board according to claim 1 wherein each touch protection cover plate segment is mechanically connected to an associated touch protection base plate segment of the same length to provide a busbar board segment of the elongated busbar board or wherein the touch protection cover plate segments and an associated touch protection base plate segment overlap at least partially.

4. The elongated busbar board according to claim 1, wherein at a predetermined reference temperature expansion joints of a predefined width are provided between adjacent busbar board segments of the elongated busbar board.

5. The elongated busbar board according to claim 1, comprises at its distal ends lateral busbar board segments surrounding a predetermined number of intermediate busbar board segments E.

6. The elongated busbar board according to claim 1, wherein each of the one or more power busbars comprises at its rear side equidistant positioning contours to place the one or more power busbars on corresponding positioning contours of the touch protection base plate segments fixed to associated touch protection cover plate segments to align the feedthrough openings of the touch protection cover plate segments with the equidistant contact openings of the one or more power busbars.

7. The elongated busbar board according to claim 1, wherein each of the one or more power busbars comprises at its front side positioning contours to align the feedthrough openings of the touch protection front plate segments with the equidistant contact openings of the one or more power busbars covered by the touch protection front plate segments.

8. The elongated busbar board according to claim 1, wherein the contact openings of the one or more power busbars are spaced apart from each other equidistantly in a predefined spacing grid, and wherein the feedthrough openings of the touch protection cover plate segments are spaced apart from each other in the same predefined spacing grid as the contact openings of the one or more power busbars.

9. The elongated busbar board according to claim 1, wherein a power feed-in of electrical power into the one or more power busbars enclosed by the elongated busbar board is provided by power feed-in plugs being pluggable into sockets of the elongated busbar board.

10. The elongated busbar board according to claim 1, wherein the one or more power busbars arranged within the elongated busbar board comprise each a U-shaped cross profile with sidewalls facing each other and the sidewalls are connected with each other by means of a connecting bridge, which comprises the contact openings for insertion of resilient electrical connection contacts of a device to be connected to said elongated busbar board from the front side.

11. The elongated busbar board according to claim 1, further comprising an elongated shape, wherein wiring combs or other extension elements are attachable to one or both long sides of the elongated busbar board.

12. A control cabinet with a control cabinet housing which comprises at least one mounting plate and/or at least one mounting frame used for mounting at least one or more elongated busbar boards according to claim 1.

13. The elongated busbar board according to claim 1, wherein the elongated busbar board is configured to be attached to a mounting plate or to a mounting frame.

14. The elongated busbar board according to claim 13, wherein the elongated busbar board is configured to be attached mechanically to counter-contours of the mounting frame or to counter-contours of the mounting plate by means of one or more of bracket elements, angled elements, adapter elements and latching elements.

15. The elongated busbar board according to claim 13, wherein the elongated busbar board is configured to be connectable without using a mechanical tool to corresponding counter-contours of the mounting plate or of the mounting frame.

16. The elongated busbar board according to claim 1, comprising several of the one or more power busbars, in which the several power busbars are elongated, are arranged in parallel and are contactable by means of associated feed-in plugs to provide a power feed-in.

17. The elongated busbar board according to claim 16, wherein the power feed-in plugs which are provided for the feed-in of electrical power into the one or more power busbars enclosed by the elongated busbar board are integrated in a multipole feed-in plug module.

18. An elongated busbar board for connection of devices to a power busbar system, comprising:
  a front side touch protection cover plate including touch protection cover plate segments made of an electrically insulating material and having feedthrough openings for electrical connection contacts of devices to be connected to the elongated busbar board, wherein the touch protection cover plate is adapted to cover one or more power busbars made of an electrically conductive material having contact openings lying directly beneath the feedthrough openings of the touch protection cover plate segments; and
  a touch protection base plate connected to said touch protection cover plate and including touch protection base plate segments made of the electrically insulating material and adapted to cover the one or more power busbars enclosed by the elongated busbar board from behind,
  wherein a thermal expansion difference caused by different thermal expansion coefficients of the electrically insulating material and of the electrically conductive material is compensated by thermal compensation elements,
  wherein each of the one or more power busbars comprises at its rear side equidistant positioning contours to place the one or more power busbars on corresponding positioning contours of the touch protection base plate segments fixed to associated touch protection cover plate segments to align the feedthrough openings of the touch protection cover plate segments with the equidistant contact openings of the one or more power busbars.

19. An elongated busbar board for connection of devices to a power busbar system, comprising:
  a front side touch protection cover plate including touch protection cover plate segments made of an electrically insulating material and having feedthrough openings for electrical connection contacts of devices to be connected to the elongated busbar board, wherein the touch protection cover plate is adapted to cover one or more power busbars made of an electrically conductive material having contact openings lying directly beneath the feedthrough openings of the touch protection cover plate segments; and
a touch protection base plate connected to said touch protection cover plate and including touch protection base plate segments made of the electrically insulating material and adapted to cover the one or more power busbars enclosed by the elongated busbar board from behind,
wherein a thermal expansion difference caused by different thermal expansion coefficients of the electrically insulating material and of the electrically conductive material is compensated by thermal compensation elements,
wherein a power feed-in of electrical power into the one or more power busbars enclosed by the elongated busbar board is provided by power feed-in plugs being pluggable into sockets of the elongated busbar board.

* * * * *